United States Patent
Okajima

(10) Patent No.: US 6,582,029 B2
(45) Date of Patent: Jun. 24, 2003

(54) BICYCLE RIM

(75) Inventor: Shinpei Okajima, Izumi (JP)

(73) Assignee: Shimano Inc., Osaka (JP)

( * ) Notice: Subject to any disclaimer, the term of this patent is extended or adjusted under 35 U.S.C. 154(b) by 63 days.

(21) Appl. No.: 09/864,363

(22) Filed: May 25, 2001

(65) Prior Publication Data

US 2002/0175560 A1 Nov. 28, 2002

(51) Int. Cl.$^7$ .............................................. B60B 21/02
(52) U.S. Cl. ................................... 301/58; 301/95.104
(58) Field of Search ...................... 301/55, 58, 95.101, 301/95.104, 95.105, 95.106, 104; 152/379.4, 381.4, 384

(56) References Cited

U.S. PATENT DOCUMENTS

| | | | |
|---|---|---|---|
| 3,915,215 A | * 10/1975 | Nebout | ..................... 152/379.4 |
| 4,351,382 A | 9/1982 | Corner et al. | |
| 4,564,056 A | 1/1986 | Doring | |
| 4,626,036 A | 12/1986 | Hinsberg et al. | |
| 4,824,177 A | * 4/1989 | Aloy | ............................. 301/58 |
| 4,878,527 A | * 11/1989 | Noma | ..................... 152/379.3 |
| 5,538,058 A | 7/1996 | Aloy | |
| 5,651,591 A | 7/1997 | Mercat et al. | |
| 5,653,510 A | * 8/1997 | Osborne | ................. 301/95.104 |
| 5,988,764 A | 11/1999 | Deetz | |
| 6,120,105 A | 9/2000 | Chern | |
| 6,145,936 A | * 11/2000 | Alberti et al. | ................. 301/58 |
| 6,145,937 A | * 11/2000 | Chen | ........................... 301/58 |
| 6,186,598 B1 | * 2/2001 | Chen | ........................... 301/58 |
| 6,367,883 B1 | * 4/2002 | Chen | ........................... 301/55 |

FOREIGN PATENT DOCUMENTS

| | | |
|---|---|---|
| EP | 0 103 724 | 3/1984 |
| EP | 0 410 672 A1 | 1/1991 |
| EP | 0 579 525 B1 | 1/1996 |
| EP | 0 790 141 A1 | 8/1997 |
| EP | 0 893 280 A1 | 1/1999 |
| FR | 1 434 207 | 1/1965 |
| FR | 1 449 826 | 7/1965 |
| GB | 1 491 140 | 11/1977 |
| JP | 60 12315 A | 1/1985 |
| TW | 167498 | 9/1991 |

OTHER PUBLICATIONS

Race Catalogue; Bike Rlms; 1 page; Tokyo International Bicycle show on Nov. 10, 2000.

Weinmann 2001 Catalogue; Bike Rims; 6 pages; Interbike Las Vegas show 2000.

Alexrims 2001 Catalogue; Bike Rims; 4 pages; Interbike Las Vegas show 2000.

* cited by examiner

Primary Examiner—Russell D. Stormer
(74) Attorney, Agent, or Firm—Shinjyu Global IP Counselors, LLP

(57) ABSTRACT

A bicycle rim includes side portions with an outer portion extending between the side portions to form a pair of outer corners, and a spoke attachment portion. The outer portion includes a pair of ridges spaced from the outer corners. The ridges preferably divide a pair of inclined surfaces. The side portions preferably include a pair of ground braking surfaces with a pair of sloping surfaces extending from the braking surfaces to a pair of outer side surfaces. A tubeless bicycle tire is mounted on the rim and includes a tread portion, a pair of sidewalls and a pair of beads. Each bead has an inner foot surface supported on one of the ridges. Preferably, each bead has a reinforcement member with a center axis. Each ridge is preferably located between one of the center axes and an inner edge of one of the inner foot surfaces.

49 Claims, 15 Drawing Sheets

BICYCLE RIM

CROSS-REFERENCE TO RELATED APPLICATIONS

This invention is related to U.S. patent application Ser. No. 09/793,973, filed Feb. 28, 2001, assigned to SHIMANO INC.

BACKGROUND OF THE INVENTION

1. Field of the Invention

This invention generally relates to a bicycle rim for use with a tubeless tire, a plurality of spokes and a hub adapted to be coupled to a bicycle frame. More specifically, the present invention relates to a bicycle rim, which maintains a tight seal with a tubeless tire even when tire pressure is lower than normal, or when a side force deflects the tire such as caused by the tire contacting an obstruction.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

It is desirable in the bicycle industry to have as few spokes as possible. One problem with conventional spokes is the concentrated stress applied to the rim. Moreover, if fewer spokes are used, the stress on the rim becomes increasingly larger. Typically, conventional spokes are attached to either the inner edge or the lateral side portions of the rim. Thus, the amount of force that can be applied to the rim by the spokes depends mainly upon the thickness of the inner edge of the rim or the lateral side portions of a rim. In order to accommodate the stress from the spokes, the inner edge of the rim can be made thicker. However, making the rim thicker increases the weight of the rim.

In recent years, wheels have been designed with reinforcing members arranged on the outer ends of the spokes to aid in disbursing the stress concentrated on portions of the rim. Such a wheel is disclosed in Shimano's U.S. Pat. No. 6,126,243. This wheel (i.e., rim, and spoke combination) is very strong, lightweight, and relatively simple and inexpensive to manufacture. However, this design requires drilling a plurality of access holes in the outer peripheral surface of the rim. The spokes and reinforcement members are inserted through these holes into spoke openings of the rim during assembly. These holes then have to be covered and a tubed tire installed. If a spoke needs to be replaced, the tire, tube and cover have to be removed from the rim so the spoke can be replaced.

Additionally, with these types of wheels, it is sometimes difficult to use a tubeless tire due to the plurality access holes. These holes are sealed in order for a tubeless tire to be utilized. The use of seals can allow leaking air, especially after prolonged use. Moreover, if a spoke needs to be replaced, the tire and seal have to be removed from the rim so the spoke can be replaced. Then, the seal and tire need to be replaced. This is inconvenient and can cause the seal and/or tire to be stretched or damaged.

There are some rims with tubeless tires on the market that do not include a plurality of access holes, eliminating the need for a seal. However, these prior rims for tubeless tires suffer from other deficiencies. Specifically, these rims can be expensive and complicated to manufacture and assemble. Moreover, these prior rims can cause punctures or leaks when an obstruction contacts the tire.

In view of the above, there exists a need for a bicycle rim that overcomes the above-mentioned problems in the prior art. This invention addresses this need in the prior art as well as other needs, which will become apparent to those skilled in the art from this disclosure.

SUMMARY OF THE INVENTION

One object of the present invention is to provide a rim for a tubeless tire that minimizes loss of air when an obstruction exerts a force on the tire.

Another object of the present invention is to provide a rim for a tubeless tire that minimizes air leakage even when the air pressure in the tire is low.

Another object of the present invention is to provide a rim for a tubeless tire that is relatively strong but relatively lightweight.

Still another object of the present invention is to provide a rim for a tubeless tire that is relatively simple and inexpensive to manufacture and/or assemble.

The foregoing objects can basically be attained by providing a bicycle rim that comprises first and second annular side portions, an outer annular portion, and a spoke attachment portion. The first and second annular side portions have first and second ribs extending toward each other to form opposing first and second annular tire supporting surfaces. The outer annular portion extends between the first and second annular side portions to form first and second outer corners. The outer annular portion includes a center connecting surface, first and second outer inclined surfaces, first and second inner inclined surfaces and first and second ridges. The first and second outer inclined surfaces are adjacent the first and second outer corners. The first and second inner inclined surfaces are adjacent the center connecting surface. The first and second ridges divide the first and second outer inclined surfaces from the first and second inner inclined surfaces, respectively. The spoke attachment portion is rigidly coupled with the first and second annular side portions.

The forgoing objects can also basically be attained by providing a bicycle rim and tire assembly comprising a bicycle rim with a bicycle tire coupled thereto. The bicycle rim includes first and second annular side portions, an outer annular portion, and a spoke attachment portion. The first and second annular side portions have first and second ribs extending toward each other to form opposing first and second annular tire supporting surfaces. The outer annular portion extends between the first and second annular side portions to form first and second outer corners. The outer annular portion includes first and second ridges spaced inwardly from the first and second outer corners, respectively. The spoke attachment portion is rigidly coupled with the first and second annular side portions. The bicycle tire includes an annular outer tread portion, first and second annular sidewalls, and first and second annular beads. The first and second annular sidewalls are coupled to the annular outer tread portion and extend radially inwardly of the annular outer tread portion. The first and second annular beads are coupled to the first and second annular sidewalls, respectively. The first and second annular beads have first and second annular side surfaces supported by the first and second annular tire supporting surfaces and first and second inner annular surfaces supported on the first and second ridges, respectively.

The foregoing objects can also basically be attained by providing a bicycle rim comprising first and second annular side portions, an outer annular portion, and a spoke attachment portion. The first and second annular side portions have first and second ends to form opposing first and second annular tire supporting surfaces. The outer annular portion extends between the first and second annular side portions and is adapted to support a tire. The spoke attachment portion is rigidly coupled with the first and second annular side portions. The first and second annular side portions include first and second outer side surfaces, first and second ground annular braking surfaces, and first and second sloping surfaces, respectively. The first and second ground annular braking surfaces are spaced from the first and second outer side surfaces. The first and second sloping surfaces extend from the first and second ground annular braking surfaces to the first and second outer side surfaces, respectively.

The foregoing objects can also be attained by providing a bicycle rim and tire assembly comprising a bicycle rim with a bicycle tire coupled thereto. The bicycle rim includes first and second annular side portions, an outer annular portion, and a spoke attachment portion. The first and second annular side portions have first and second ribs extending toward each other to form opposing first and second annular tire supporting surfaces. The outer annular portion extends between the first and second annular side portions to form first and second outer corners. The outer annular portion includes first and second ridges spaced inwardly from the first and second outer corners, respectively. The spoke attachment portion is rigidly coupled with the first and second annular side portions. The bicycle tire includes an annular outer tread portion, first and second annular sidewalls, and first and second annular beads. The first and second annular sidewalls are coupled to the annular outer tread portion and extend radially inwardly of the annular outer tread portion. The first and second annular beads are coupled to the first and second annular sidewalls and have first and second inner foot surfaces supported on the first and second ridges, respectively. The first and second annular beads have first and second annular reinforcement members with first and second center axes arranged such that the first and second ridges are located between the first and second center axes and first and second inner edges of the first and second foot surfaces, respectively.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
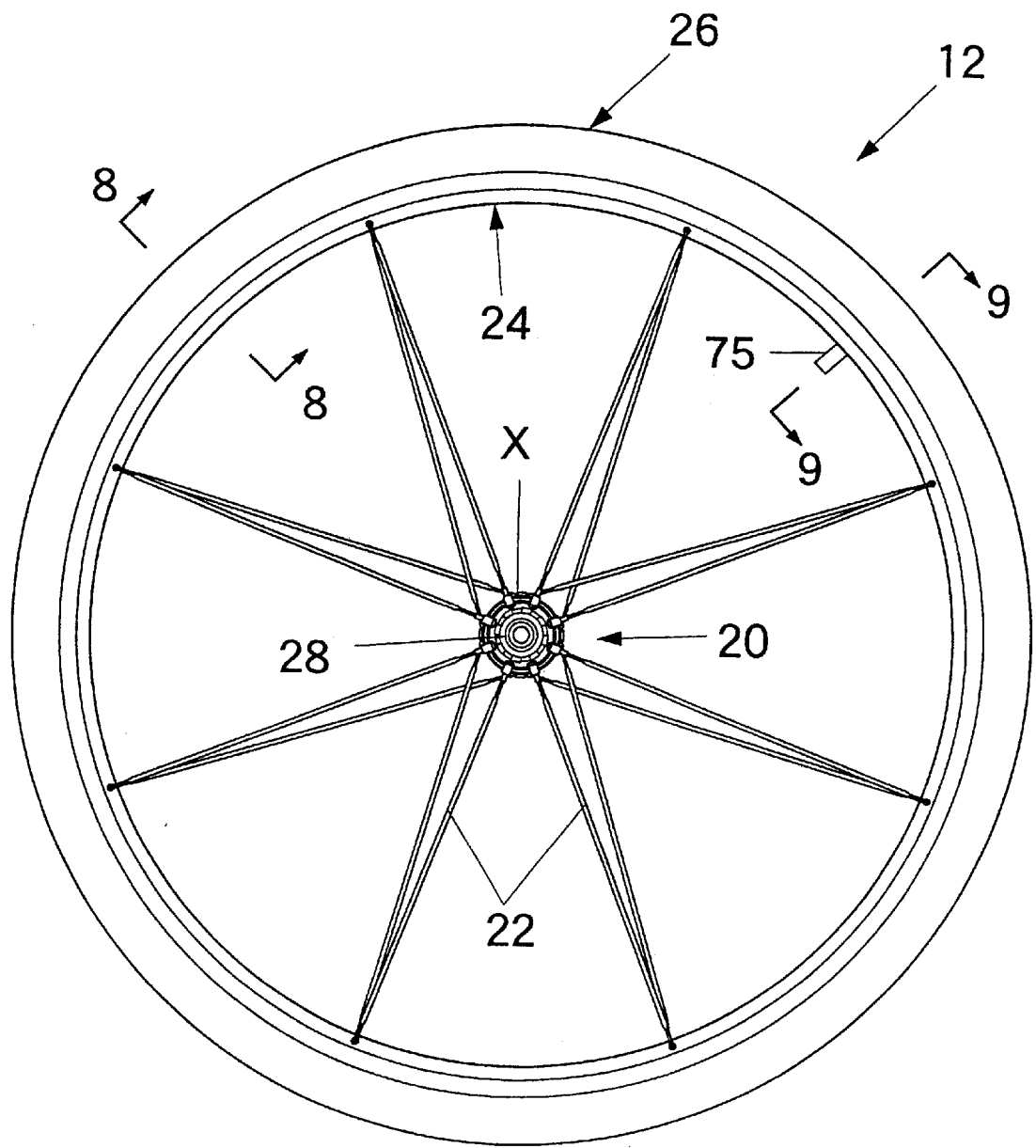
FIG. 1 is a side elevational view of a bicycle wheel having a rear hub, a plurality (sixteen) of spokes with reinforcement members and a rim in accordance with a preferred embodiment of the present invention.
Figure 2:
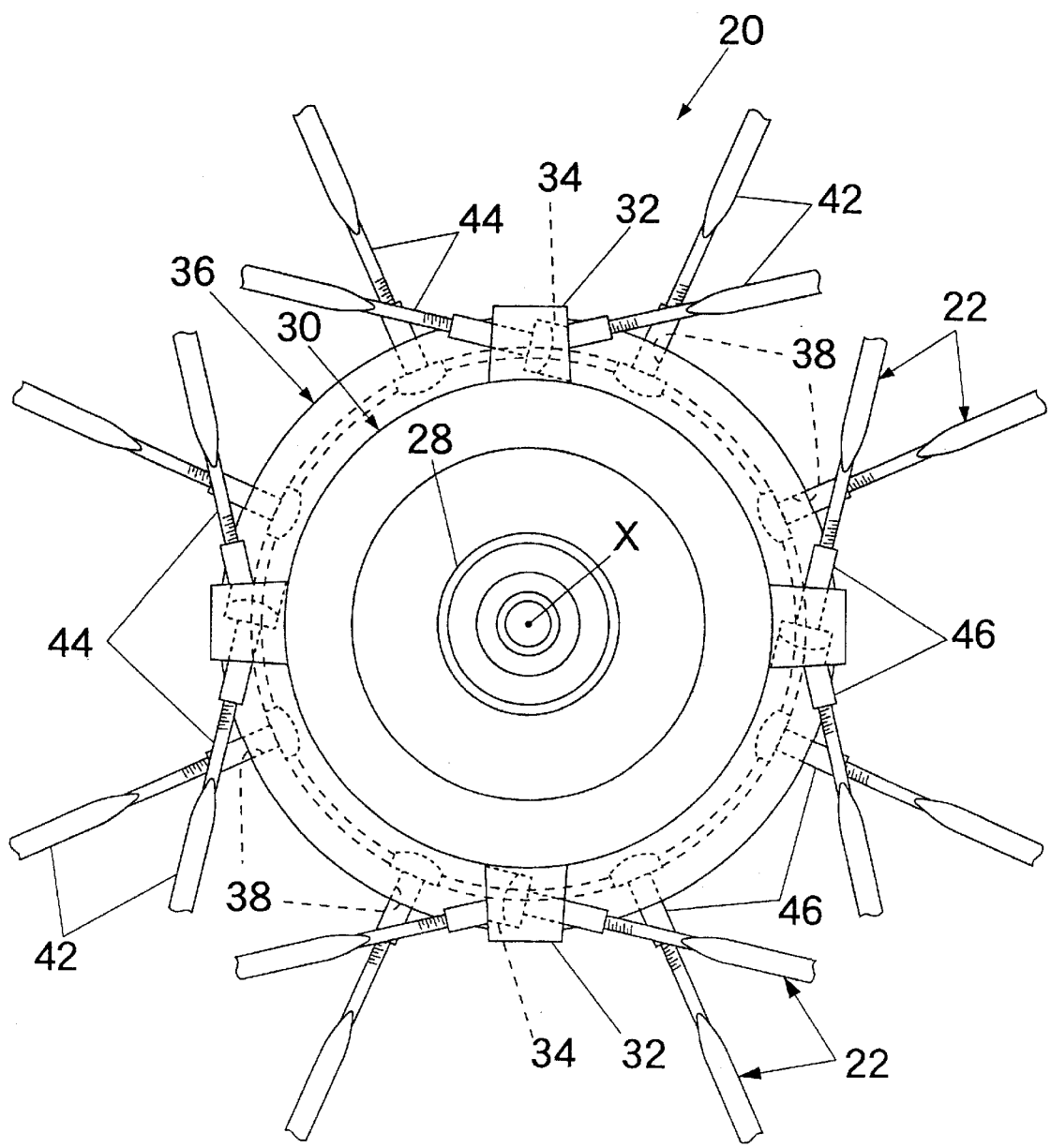
FIG. 2 is an enlarged side elevational view of the rear bicycle hub illustrated in FIG. 1 with the inner end portions of the spokes coupled thereto.

Referring initially to FIGS. 1 and 2, a rear bicycle wheel 12 is illustrated in accordance with the present invention. Bicycle wheel 12 has a central hub 20, a plurality of outwardly extending spokes 22 and an annular rim 24 with a pneumatic tire 26 coupled thereto. Of course, it will be apparent to those skilled in the art from this disclosure that bicycle wheel 12 can be utilized as either a front bicycle wheel by modifying the hub 20 or a rear bicycle wheel. In the illustrated embodiment, bicycle wheel 12 is a rear bicycle wheel with a first set of radial spokes and a second set of tangential spokes. However, it will be apparent to those skilled in the art from this disclosure that the description pertaining to the construction of bicycle wheel 12 applies to either a front bicycle wheel or a rear bicycle wheel.

Figure 20:
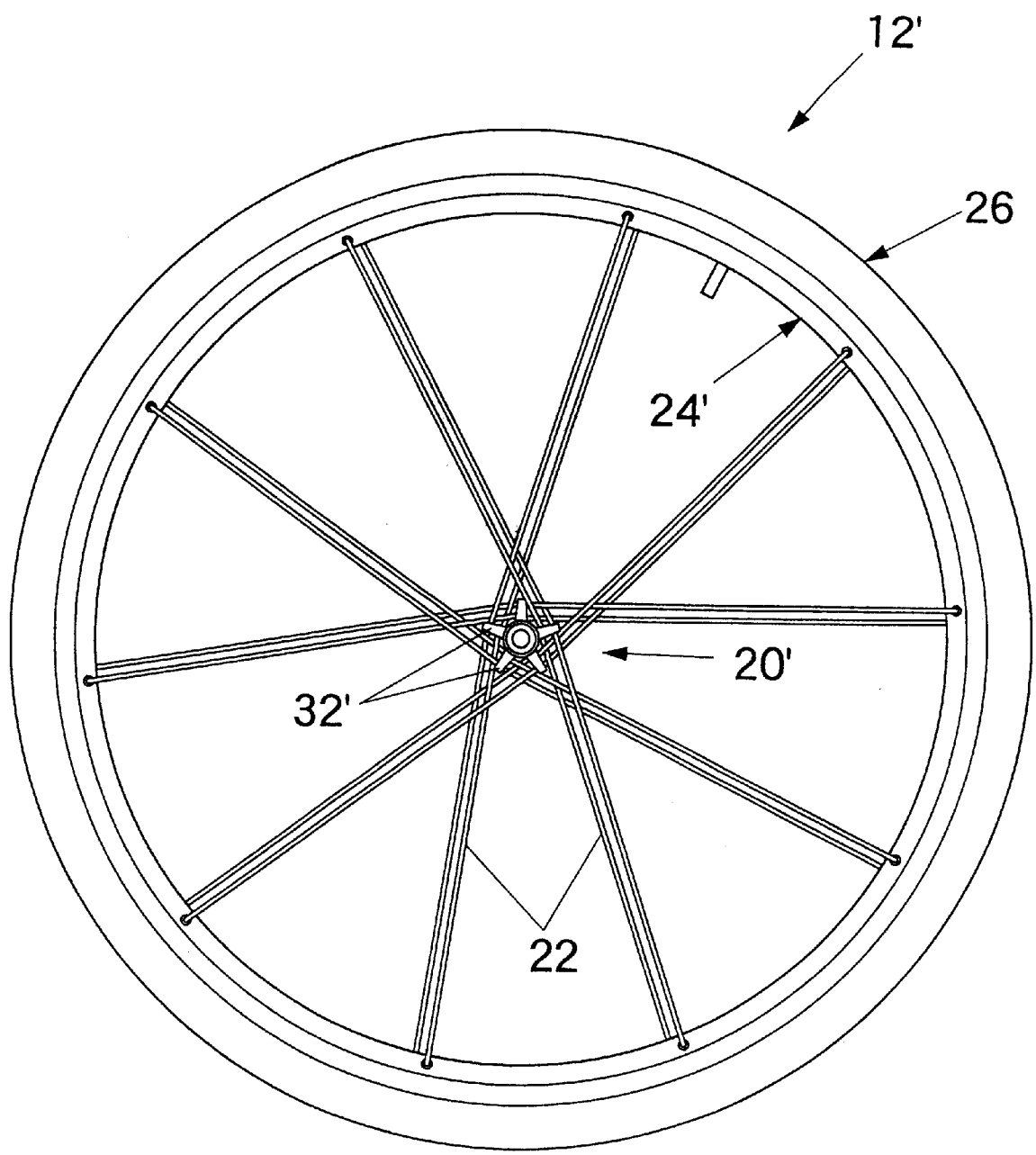
FIG. 20 is a side elevational view of a front bicycle wheel with a front hub, a plurality (twenty) of spokes with reinforcement members and a rim in accordance with an alternate embodiment of the present invention.

In the illustrated embodiment shown herein, bicycle wheel 12 has sixteen spokes 22 extending between central hub 20 and annular rim 24. Of course, it will be apparent to those skilled in the art from this disclosure that the bicycle wheel 12 can have fewer or more spokes 22 if needed and/or desired. For example, bicycle wheel 12 could have twenty-four spokes with twelve radial spokes and twelve tangential spokes. Alternatively, bicycle wheel 12 could have all tangential spokes or all radial spokes. Moreover, in the illustrated embodiment, opposing pairs of spokes 22 are circumferentially aligned with each other at annular rim 24. Of course it will be apparent to those skilled in the art that opposing pairs of spokes could be circumferentially offset from each other at annular rim 24. For example as seen in FIG. 20, a front bicycle wheel 12' is illustrated in accordance with the present invention with all tangential spokes 22 that have circumferentially offset outer ends, as discussed below.

As seen in FIG. 2, hub 20 has a tubular body section 30 with four spoke attachment points 32 arranged axially on one side of tubular body section 30. Spoke attachment points 32 are provided with holes 34 for tangentially coupling spokes 22 (tangential spokes) thereto. A tubular mounting portion 36 is arranged axially on the opposite side of tubular body portion 30. Tubular mounting portion 36 is provided with a plurality of spoke attachment slots 38 for radially coupling spokes 22 (radial spokes) thereto. Radial spokes and tangential spokes have identical configurations. However, the length (or size) of tangential spokes may be slightly different than radial spokes. Accordingly, radial and tangential spokes will be given the same reference numerals herein. Tubular body section 30 has an axial bore that is adapted to receive a hub assembly 28 therein.

The number and shape of the spoke attachment points 32 and the configuration of tubular mounting portion 36 will depend upon the number of spokes and their shapes. Accordingly, it will be apparent to those skilled in the art from this disclosure that other types and shapes of hubs can be utilized in connection with the present invention. Moreover, it will be apparent to those skilled in the art that hub 20 could be designed to use all radial/tangential spokes and/or more or fewer than sixteen spokes. For example, hub 20 could be designed with six spoke attachment points (with two holes formed in each spoke attachment point) and twelve spoke attachment slots formed in the tubular mounting portion to form a twenty-four spoke wheel.

Figure 12:
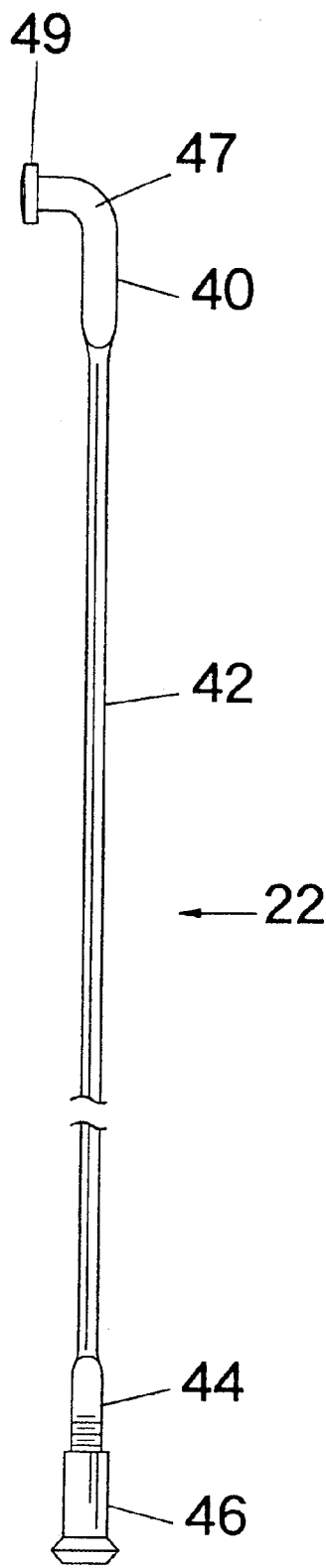
FIG. 12 is an enlarged, partial side elevational view of one of the spokes illustrated in FIGS. 1–4, 10 and 11 in accordance with the present invention.
Figure 13:
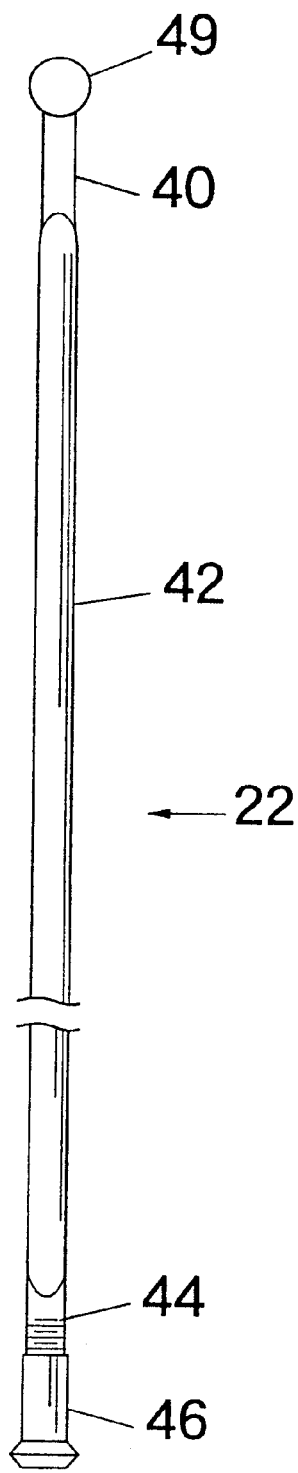
FIG. 13 is a partial side edge elevational view of the spoke illustrated in FIG. 12.
Figure 14:
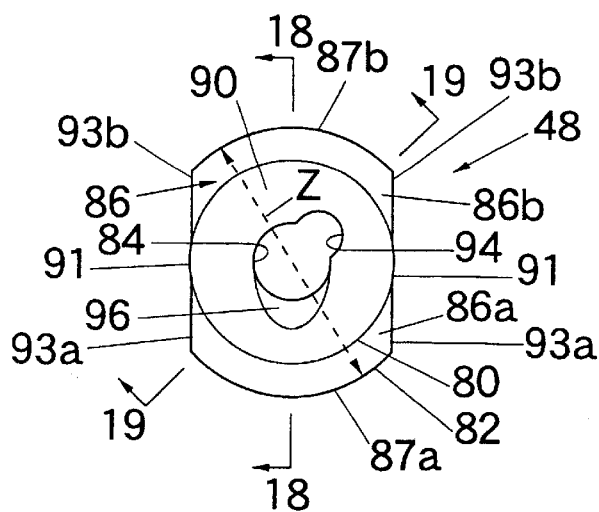
FIG. 14 is an enlarged side elevational view of one of the reinforcement members or washers illustrated in FIGS. 3, 4, 10 and 11.
Figure 17:
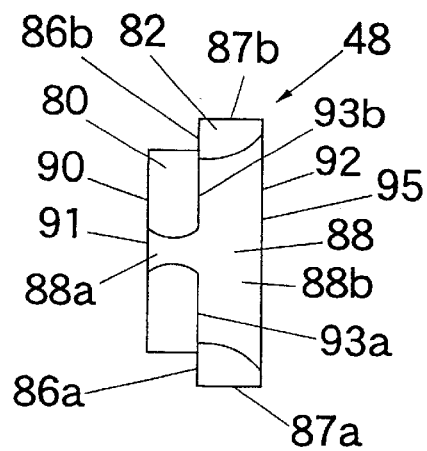
FIG. 17 is a side edge elevational view of the reinforcement member or washer illustrated in FIGS. 14–16.

Spokes 22 are constructed as a one-piece, unitary member that have an outer end portion 40, a center or a middle portion 42 and an inner end portion 44, as seen in FIGS. 12 and 13. Inner end portions 44 of spokes 22 are preferably externally threaded for receiving spoke nipples 46, as discussed in more detail below. Outer end portions or spoke heads 40 are coupled to rim 24 by reinforcement members or washers 48 as also discussed below in more detail. Washers 48 are designed to disperse the stress applied to rim 24 by spokes 22. The outer end portions 40 have a bent section 47 with an enlarged head 49 formed at the free end of bent section 47. The enlarged head 49 has a larger width or diameter to secure spoke 22 to rim 24 via washer 48.

Figure 8:
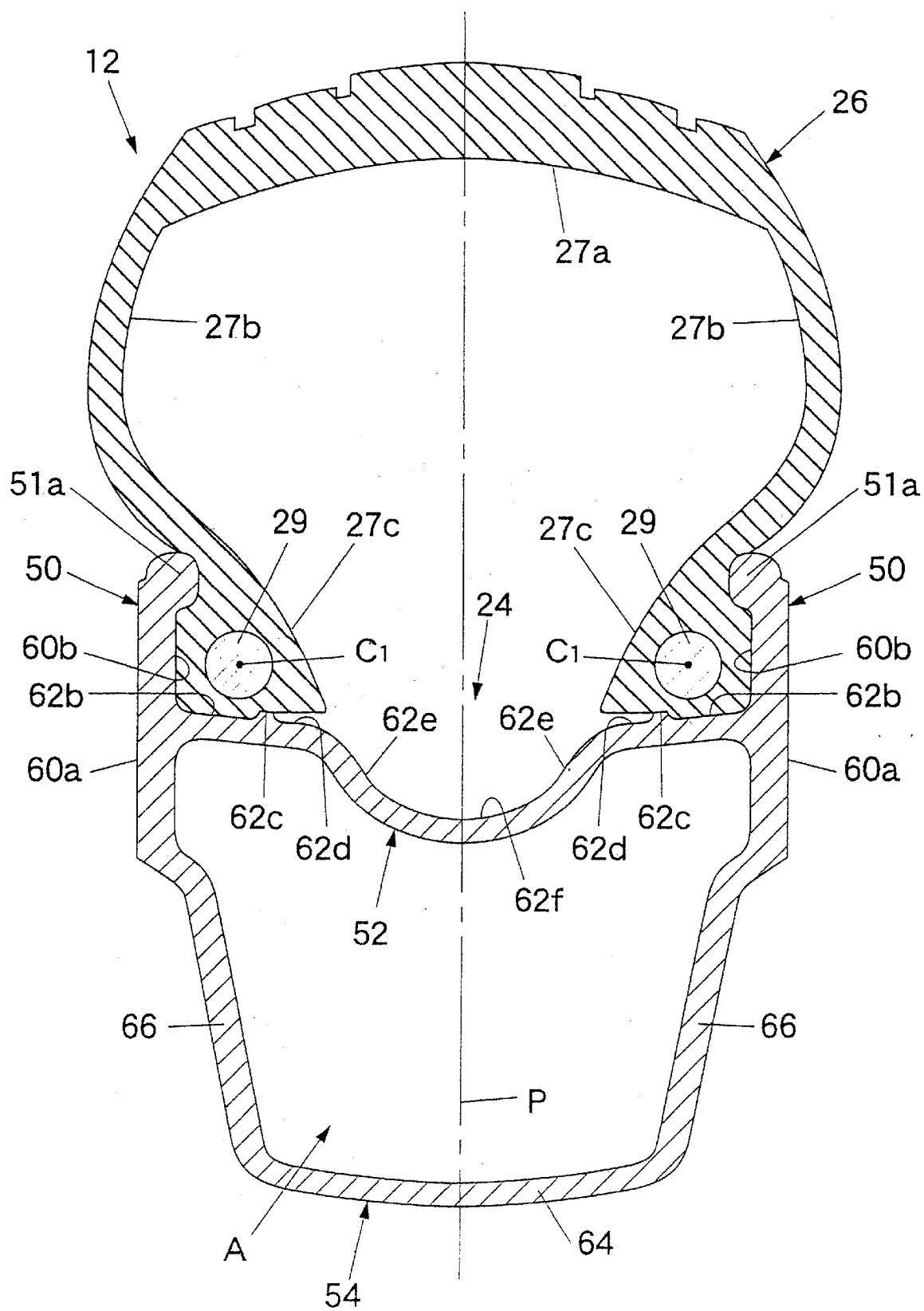
FIG. 8 is a partial, cross-sectional view of the bicycle wheel illustrated in FIG. 1 as seen along section line 8—8 of FIG. 1 illustrating the position of the tire in the installed position.

Rim 24 is designed to have pneumatic tire 26 fastened thereto as seen in FIGS. 1 and 8. Rim 24 is especially designed for use with a tubeless pneumatic tire 26. Pneumatic tire 26 is a conventional tire, which is available through various tire companies such as HUTCHINSON and MICHELIN. Tire 26 will be discussed in more detail below. Rim 24 is constructed of a substantially rigid material, such as those materials, which are well known in the art. For example, rim 24 can be constructed of any suitable metallic material, such as plated steel, stainless steel, aluminum, magnesium or titanium, as well as other non-metallic materials, such as a carbon fiber composite.

Figure 4:
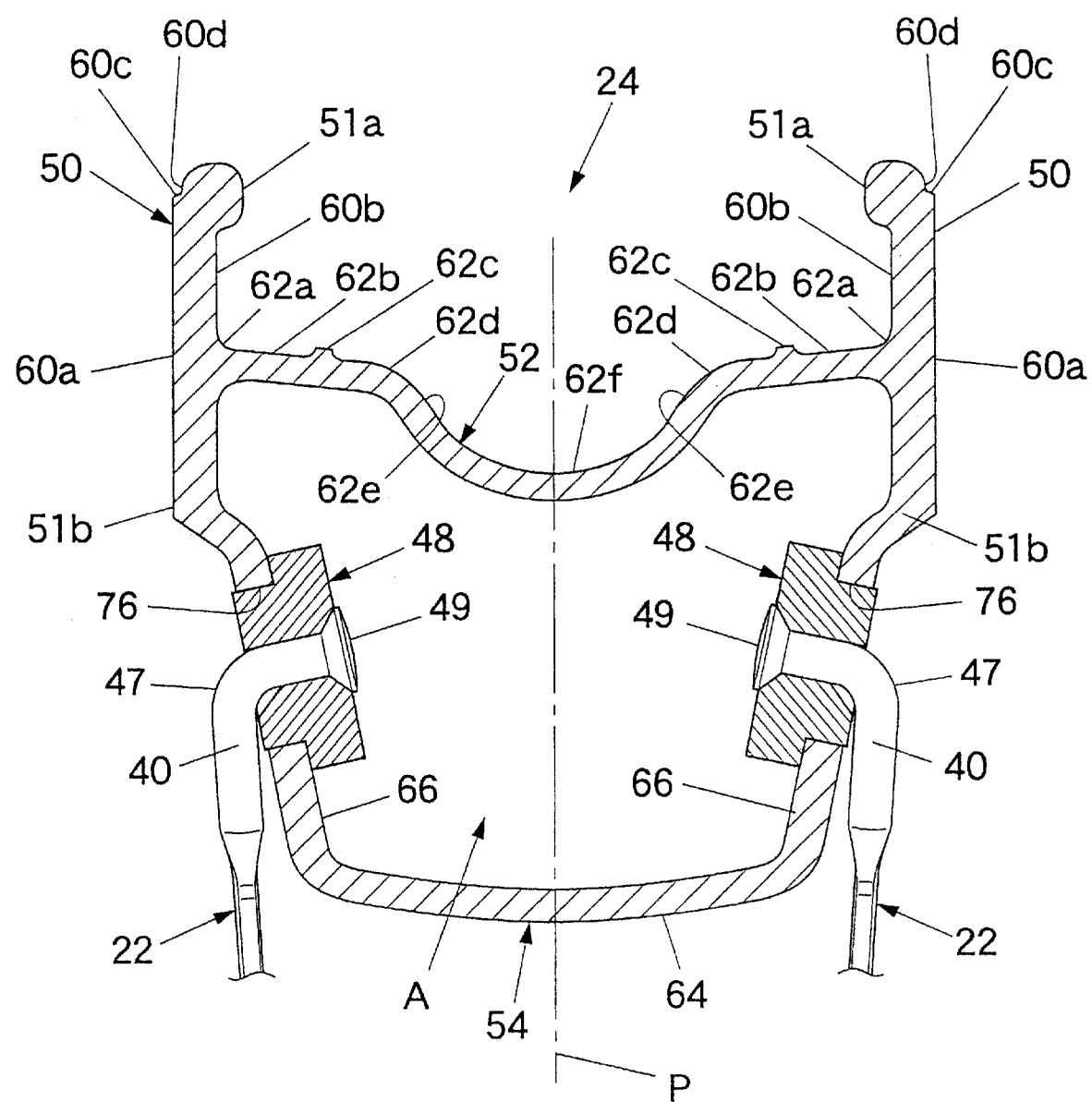
FIG. 4 is a partial, cross-sectional view of the bicycle rim as seen along section line 4—4 of FIG. 3 with a pair of spokes illustrated in elevation and the rim and reinforcement members illustrated in cross-section.
Figure 9:
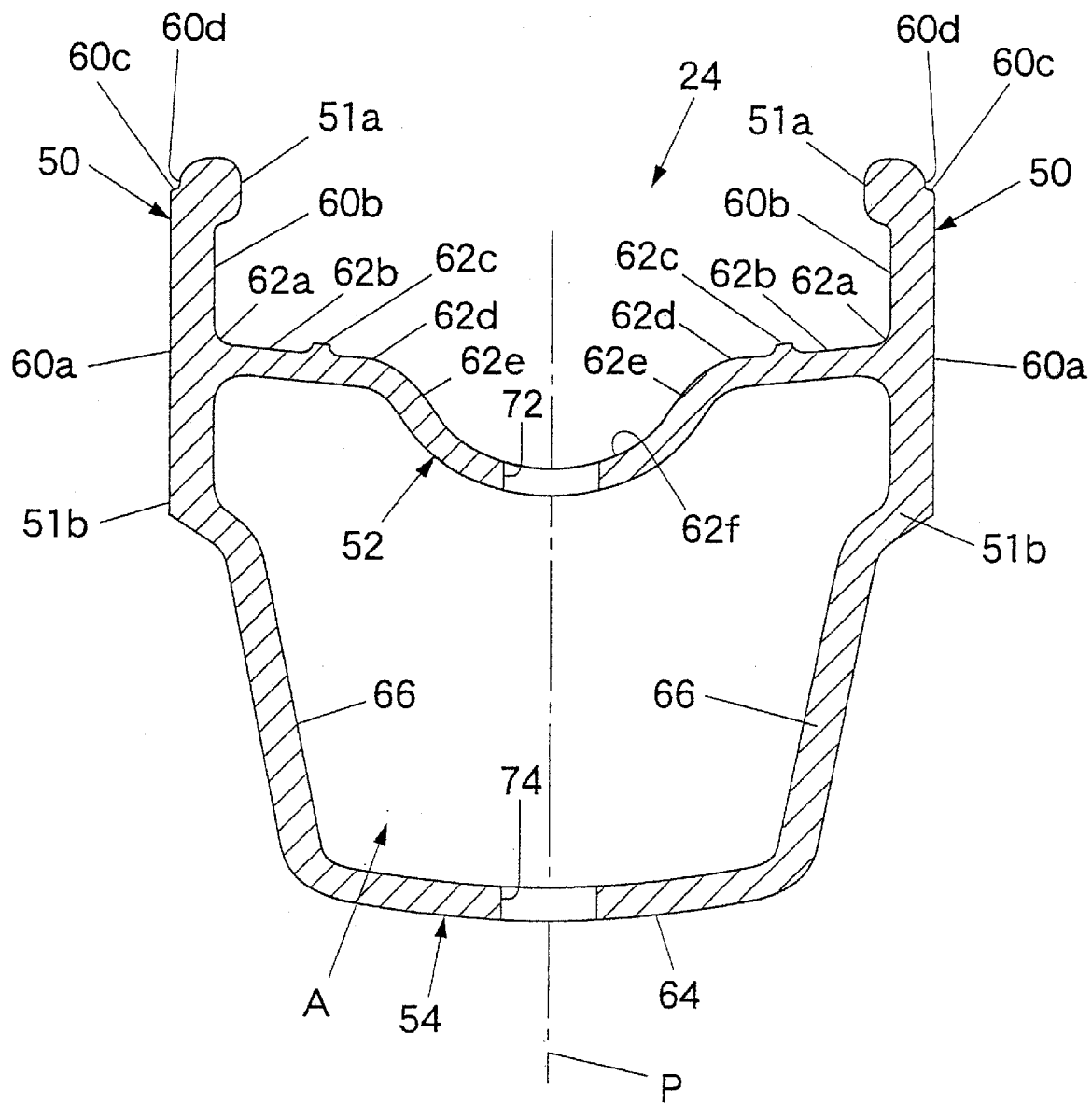
FIG. 9 is a partial, cross-sectional view of the bicycle rim illustrated in FIGS. 1 and 3–8 as seen along section line 9—9 of FIG. 1 to show a valve receiving aperture.

Rim 24 is substantially circular as seen in side elevation (FIG. 1), and is preferably symmetrical relative to a center plane P of rim 24. Thus, like reference numerals will be used to refer to opposing symmetrical parts. Specifically, rim 24 has a pair (first and second) of annular side portions 50, an outer annular portion 52 and an inner annular portion or spoke attachment portion 54 rigidly coupled together to form an annular hollow area A, as seen in FIGS. 4, 8 and 9. Rim 24 is designed for rotation about a center axis X. Annular side portions 50 are plate-shaped members formed with a pair (first and second) of ribs 51a and a pair (first and second) of bent sections 51b, respectively. Outer annular portion 52 is a tubular member that extends axially between annular side portions 50. Outer annular portion 52 is fixedly coupled to annular side portions 50 at a radial position between ribs 51a and bent sections 51b. Inner annular portion 54 is a tubular member that is substantially U-shaped (as seen in cross-section in FIGS. 4, 8 and 9). Inner annular portion 54 is fixedly coupled to bent sections 51b of annular side portions 50. Thus, inner annular portion 54 is rigidly coupled with annular side portions 50.

Figure 3:
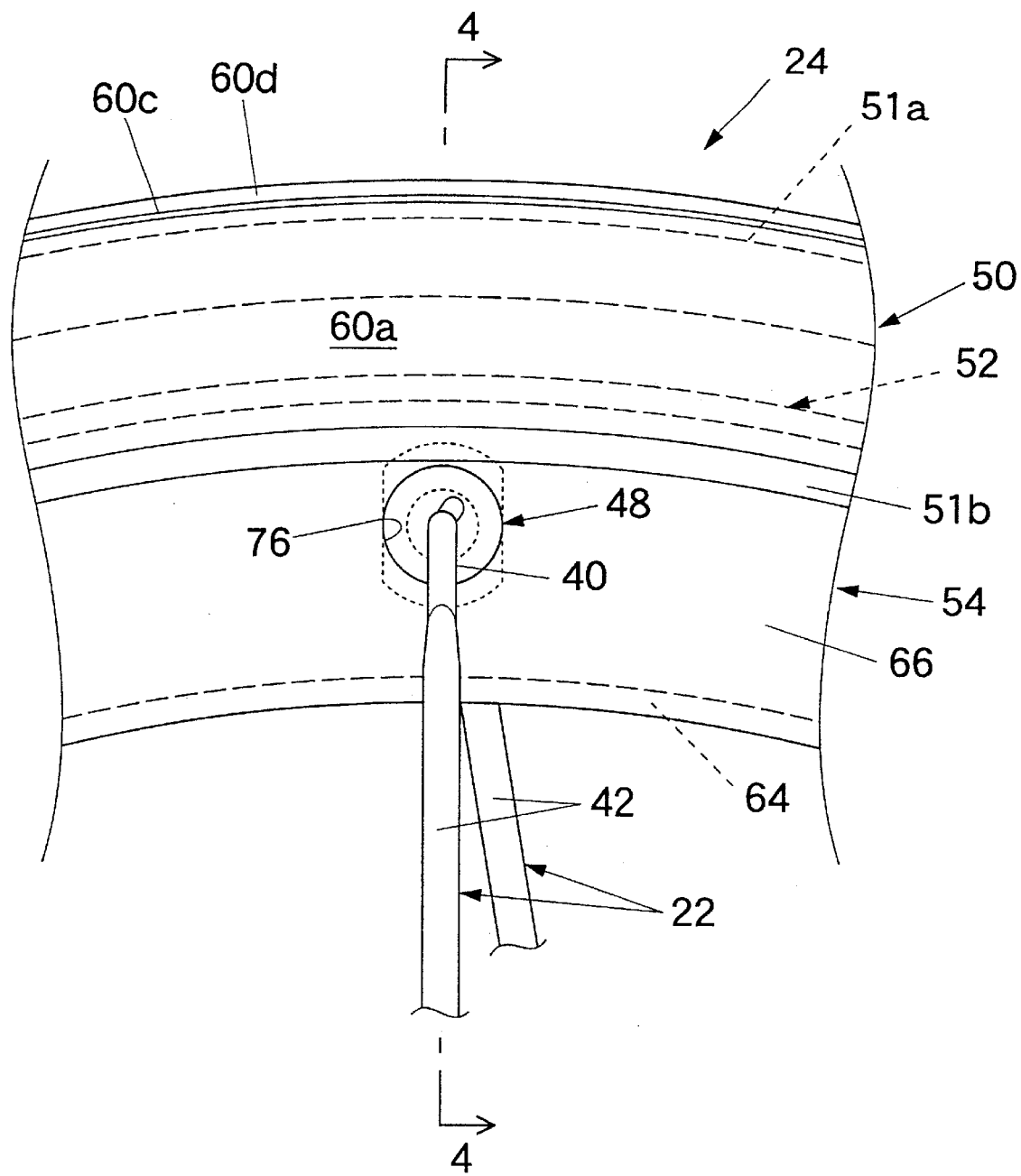
FIG. 3 is an enlarged, partial side elevational view of a portion of the bicycle wheel illustrated in FIG. 1 illustrating the connection between the rim and two of the spokes of the bicycle wheel aligned in the circumferential direction.
Figure 5:
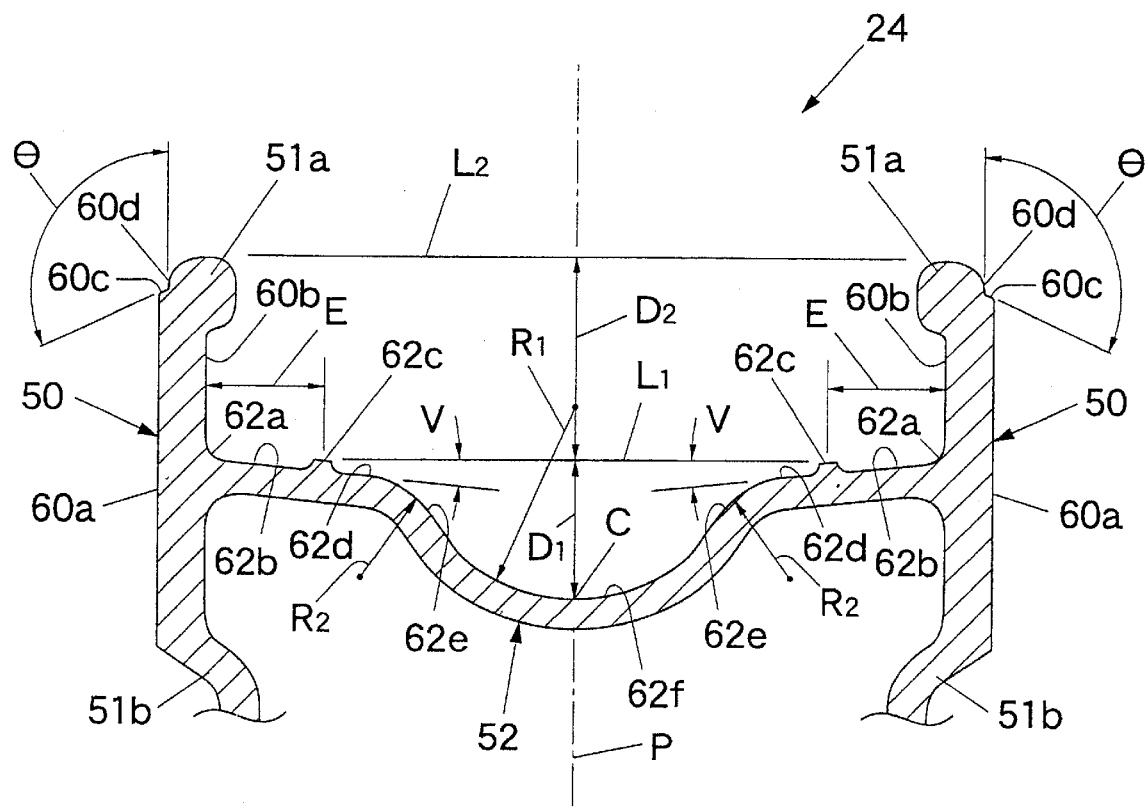
FIG. 5 is an enlarged, partial cross-sectional view of the outer portion of the bicycle rim illustrated in FIG. 4.

As best seen in FIGS. 3–5, annular side portions 50 include first and second annular braking surfaces 60a facing in axially opposite directions away from each other and a pair (first and second) of opposed axially facing annular tire supporting surfaces 60b facing toward each other, respectively. Two (first and second) annular sloping surfaces 60c extend from braking surfaces 60a to a pair (first and second) of annular outer curved side surfaces 60d of ribs 51a, respectively. Outer side surfaces 60d are preferably convex curved surfaces and are preferably spaced (or offset) about 0.3 mm from braking surfaces 60a. Tire supporting surfaces 60b face each other and are formed on the respective opposite sides of annular side portions 50 from braking surfaces 60a. In the illustrated embodiment, tire supporting surfaces 60b include inner recessed sections and retaining sections extending from the recessed sections to form the pair of ribs 51a. The recessed sections of the tire supporting surfaces 60b are preferably substantially parallel to each other and parallel to braking surfaces 60a.

The arrangement of sloping surfaces 60c and outer curved side surfaces 60d reduces the material of rim 24, and thus, the weight of rim 24. Specifically, rim is preferably formed with the sloping surfaces 60c extending to a pair of annular sidewalls (not shown) spaced more than about 0.3 mm from outer curved side surfaces 60d. Preferably the braking surfaces 60a are then formed by grinding (cutting/shading) the annular side portions 50 of rim 24 in a relatively conventional manner. The outer curved side surfaces 60d aid in monitoring the thickness (or distance between) the ground annular braking surfaces 60a and the outer curved side surfaces 60d. Preferably, the rim is designed such that the ground annular braking surfaces 60a are spaced about 0.3 mm from outer curved side surfaces 60d when grinding (cutting/shading) is completed.

The sloping surfaces 60c are preferably angled about 240° relative to the ground braking surfaces 60a. Thus, the sloping surfaces 60c preferably form an angle θ of about 120° relative to the outer side surfaces 60d (i.e. relative to a line tangent to the outer curved side surfaces 60d at the termination points of the sloping surfaces 60c). In the illustrated embodiment, each of the outer convex curved side surfaces 60d has a radius of curvature of about 1.0 mm. Therefore, the thickness of the braking areas can be easily monitored or observed (i.e. during the grinding process or during use of the rim 24). In other words, the arrangement of the sloping surfaces 60c and the outer curved side surfaces 60d can also act as wear indicators when braking surfaces 60a wear about 0.3 mm (corresponding to the axial position of outer curved side surfaces 60d).

Ribs 51a extend axially inwardly toward each other to retain tire 26. Preferably, annular side portions 50 have a minimum thickness of about 1.3 mm. Ribs 51a preferably extend axially toward each other about 0.85 mm from respective side portions 50 to form the recessed sections of tire supporting surfaces 60b. Bent sections 51b are angled sections that form sharp external annular corners with braking surfaces 60a of side portions 50. Such an arrangement increases the strength and durability of rim 24. Additionally, this configuration reduces the amount of material utilized in rim 24.

Outer annular portion 52 is preferably approximately 0.9 mm thick and extends generally axially between annular side portions 50 to form a pair (first and second) of annular outer corners or corner surfaces 62a. Outer annular portion 52 preferably includes a pair (first and second) of outer annular inclined surfaces 62b extending from outer corners 62a, a pair (first and second) of annular ridges 62c and a pair (first and second) of inner annular inclined surfaces 62d. Outer annular portion 52 also preferably includes a pair (first and second) of annular transitional inner corners 62e and an annular connecting surface 62f that connect the inner inclined surfaces 62d together. One of the annular ridges 62c divides each pair of inner and outer annular inclined surfaces 62b and 62d. The ridges 62c are preferably each spaced a distance E from the recessed sections of the tire supporting surfaces 60b as seen in FIG. 5. The shape of the annular ridges 62c will be discussed in more detail below.

Annular connecting surface 62f is preferably a concave curved tubular surface extending in an axial direction and preferably has a radius of curvature $R_1$ of approximately 4.5 mm as also seen in FIG. 5. Transitional inner corners 62e are preferably formed by convex curved tubular surfaces, which connect concave curved connecting surface 62f to annular inner inclined surfaces 62d in a smooth manner. In other words, there are no sharp changes in direction or transitions between curved connecting surface 62f and annular inner inclined surfaces 62d.

Curved connecting surface 62f preferably has a center point C arranged on the center plane P of the bicycle rim 24 as seen in FIG. 5. Center point C lies on a circle surrounding rotational axis X and passing through the radially innermost point of curved connecting surface 62f. Center point C is preferably radially spaced inwardly a distance $D_1$ of approximately 3.95 mm from an imaginary line $L_1$ passing through the pair of outer corners 62a. Moreover, center point C of curved connecting surface 62f is preferably spaced radially inwardly approximately 9.7 mm from an imaginary line $L_2$ passing through the outer peripheral edges of the annular side portions 50. Thus imaginary line $L_1$ is preferably spaced a distance $D_2$ of about 5.75 mm from imaginary line $L_2$. In any event, imaginary line $L_1$ is preferably spaced a distance $D_2$ of between about 4.5 mm and about 6.5 mm from imaginary line $L_2$.

Imaginary lines $L_1$ and $L_2$ are parallel to the center axis X of bicycle rim 24 and are parallel to each other as seen in FIGS. 1 and 5. In other words, imaginary lines $L_1$ and $L_2$ lie on concentric imaginary cylinders formed about center axis X of bicycle rim 24, the imaginary cylinders passing through outer corners 62a and outer peripheral edges of annular side portions 50, respectively. Thus, a tire receiving recess is formed between annular side portions 50 and radially outwardly of outer annular portion 52.

Referring still to FIG. 5, outer and inner annular inclined surfaces 62b and 62d are preferably angled an angle V of between about three degrees and about seventeen degrees relative to imaginary line $L_1$ passing through outer corners 62a. More specifically, outer and inner annular inclined surfaces 62b and 62d are preferably angled an angle V of about five degrees relative to imaginary line $L_1$. Moreover, the outer and inner annular inclined surfaces 62b and 62d are preferably substantially parallel to each other with one of the annular ridges 62c located therebetween. In other words, outer annular inclined surfaces 62b extend radially inwardly from outer corners 62a toward curved connecting surface 62f and terminate at ridges 62c. On the other hand, inner annular inclined surfaces 62d extend radially inwardly from ridges 62c and terminate at transitional inner corners 62e. Thus, a substantially U-shaped tire receiving recess is formed.

As mentioned above, transitional inner corners 62e are preferably formed of convex curved surfaces that connect inner annular inclined surfaces 62d with curved connecting surface 62f. More specifically, transitional inner corners 62e each preferably has a radius of curvature $R_2$ of approximately 3.0 mm such that a smooth transition between curved connecting surface 62f and inner annular inclined surfaces $62d$ is formed. Therefore, radius of curvature $R_2$ is preferably equal to about two-thirds of radius of curvature $R_1$ such that a smooth transition is formed. In any event, radius of curvature $R_2$ and radius of curvature $R_1$ are configured to form a smooth transition without abrupt changes in direction between inner annular inclined surfaces $62d$ and curved connecting surface $62f$. Therefore, when installing and inflating pneumatic tubeless tire 26 on rim 24, the inner edges of tire 26 can slide along curved connecting surface $62f$, transitional inner corners $62e$ and inner annular inclined surfaces $62d$ toward supported positions adjacent tire supporting surfaces $60b$, respectively.

Figure 6:
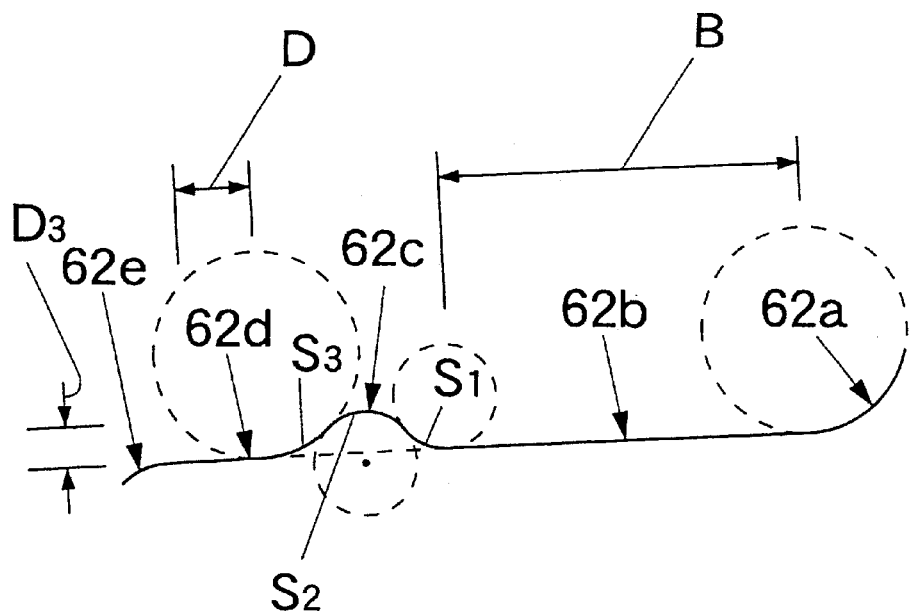
FIG. 6 is an enlarged diagrammatic view of a first inclined portion of the outer portion of the bicycle rim illustrated in FIG. 5, illustrating the shape of a first ridge.
Figure 7:
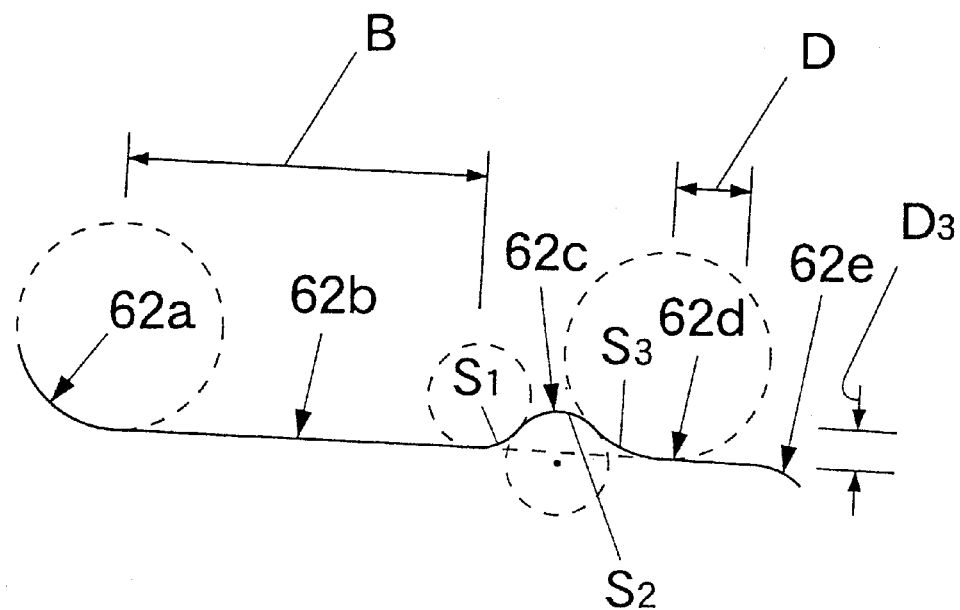
FIG. 7 is an enlarged diagrammatic view of a second inclined portion of the outer portion of the bicycle rim illustrated in FIG. 5, illustrating the shape of a second ridge.

Referring now to FIGS. 6 and 7, each of the outer annular inclined surfaces $62b$ preferably has a length B of approximately 1.92 mm, while each of the inner annular inclined surfaces $62d$ preferably has a length D of approximately 0.16 mm. In any event, length D is preferably less than about one-tenth of length B. Moreover, inner and outer annular inclined surfaces $62d$ and $62b$ are preferably straight, flat conical surfaces. Each of the annular ridges $62c$ is basically formed of three curved sections. Specifically, each annular ridge $62c$ includes an annular outer concave section $S_1$, an annular convex section $S_2$ and an annular inner concave section $S_3$.

Each annular outer concave section $S_1$ preferably has a radius of curvature equal to the radius of curvature of each annular convex section $S_2$. Each annular inner concave section $S_3$ preferably has a radius of curvature larger than annular outer concave section $S_1$ and annular convex section $S_2$. Thus, a smooth gradual transition between annular convex section $S_2$ and annular inner concave section $S_3$ is formed. In the illustrated embodiment, each outer concave section S and each convex section $S_2$ preferably has a radius of curvature of about 0.4 mm.

Each convex section $S_2$ has an outer edge that is preferably spaced an amount smaller than the radius of curvature of each convex section $S_2$ from the inner and outer inclined surfaces $62d$ and $62b$. Thus, the outer edge of each convex section $S_2$ is preferably spaced a distance $D_3$ from a line passing through respective pairs of inner and outer inclined surfaces $62d$ and $62b$. Distance $D_3$ is about 0.3 mm in the illustrated embodiment. Each annular inner concave section $S_3$ preferably has a radius of curvature of about 0.8 mm (or about double the radius of curvature of each annular convex section $S_2$). This arrangement allows portions of the tire 26 to move outwardly over ridges $62c$ relatively easily, as discussed below in more detail. However, this arrangement also prevents portions of the tire 26 from moving (back) over ridges $62c$ after tire 26 is completely installed on rim 24, and creates a tight seal between tire 26 and rim 24, as also discussed in more detail below.

Referring to FIG. 8, tire 26 is a tubeless tire with an annular outer tread portion $27a$, a pair of annular sidewalls $27b$ and a pair of annular retaining portions or beads $27c$. Annular sidewalls $27b$ extend radially inwardly of outer tread portion $27a$. Annular beads $27c$ form the inner periphery of tire 26. Tire 26 is preferably symmetrical relative to center plane P. Each annular retaining portion or bead $27c$ includes an annular reinforcement member 29 and is retained within the tire receiving recess of rim 24. More specifically, beads $27c$ have outer axially facing surfaces that contact tire supporting surfaces $60b$ and ribs $51a$ when tire 26 is inflated, respectively. Moreover, beads $27c$ have substantially flat inner foot or lower surfaces that contacts outer annular portion 52. The annular reinforcement members 29 are preferably substantially non-deformable members formed of metallic or non-metallic material.

For example, in FIG. 8, reinforcement members 29 are illustrated as metallic wires with a circular cross-sectional shape. However, reinforcement members 29 could also be formed of non-metallic material such as an aramid fiber (or woven aramid fibers), sold under the trademark KEVLAR, or any other suitable non-metallic material. Preferably reinforcement members 29 each have a cross-sectional diameter of between about 2.0 and about 3.0 mm. More specifically, each reinforcement member 29 preferably has a substantially circular cross-sectional shape with a center axis $C_1$. Tires such as tire 26 are well known in the art and are available through various tire companies such as HUTCHINSON and MICHELIN. However, due to the configuration of rim 24, particularly outer annular portion 52 (curved connecting surface $62f$, transitional inner corners $62e$, ridges $62c$ and annular inclined surfaces $62b$ and $62d$), tubeless tire 26 can be easily mounted in the tire receiving recess of rim 24, and securely retained therein.

Mounting of tire 26 on rim 24 will now be discussed in more detail. First, tire 26 is mounted on the rim 24 with the beads $27c$ arranged in the curved connecting surface $62f$. At this stage, tire 26 is free of air. When the tire is inflated, beads $27c$ will move toward their installed or seated positions (i.e. move outwardly toward tire supporting surfaces $60b$). When the air pressure in tire 26 reaches about twenty-five lbs. psi, the beads $27c$ will move into their seated positions, as seen in FIG. 8. The inner or lower surfaces of beads $27c$ are deformed slightly by ridges $62c$ as beads $27c$ move to their seated positions to form a tight seal with outer annular portion 52. Inflation of the tire is continued to an optimal pressure of between about twenty-nine lbs. psi and about fifty-eight lbs. psi.

When tire 26 is mounted on rim 24 and properly inflated, reinforcement members 29 are firmly located between the ribs $51a$ and the ridges $62c$, as seen in FIG. 8. Specifically, annular reinforcement members 29 are spaced from the outer annular side surfaces of the beads $27c$ (i.e. from tire supporting surfaces $60b$) such that reinforcement members 29 are at least partially located above the ridges $62c$, respectively. Preferably, the reinforcement members do no extend inwardly toward each other beyond the ridges $62c$ such that the beads $27c$ are securely retained. However, the beads $27c$ are supported on the ridges $62c$ such that a portion of each bead $27c$ (i.e. inner toes of beads $27c$) extends inwardly beyond the respective ridge $62c$. In other words, the ridges $62c$ are arranged between the center axes $C_1$ of reinforcement members 29 and inner edges of the inner foot surfaces of beads $27c$ (i.e. axially inner toes of beads $27c$). Additionally, each of the beads $27c$ preferably includes an annular recess arranged to receive one of the ribs $51a$ such that the reinforcement members are located below the ribs.

Still referring to FIG. 8, due to the above configuration, loss of air can be minimized when tire 26 encounters a force. More specifically, when an obstruction such as a rock contacts tire 26, a force is exerted on tire 26. Due to the configuration of outer annular portion 52, a localized deflection or deformation occurs in the tire 26. However, the beads 27 and the reinforcing members 29 of tire 26 are retained in their seated positions due to the configuration of outer annular portion 52. Moreover, loss of air is minimized due to the structure of rim 24. Furthermore, due to this configuration, loss of air is minimized and a tight seal is maintained even if tire pressure falls below the normal or optimal level.

As best seen in FIG. 9, outer annular portion 52 is preferably free of openings except for a single valve aperture 72 that is adapted to receive part of a valve 75 therein such that tubeless tire 26 can be used with rim 24, as discussed below. In any event, outer annular portion 52 preferably has fewer openings than half of the number of spokes coupled to rim 24, as also discussed below in more detail. For example, if rim 24 has sixteen spokes, outer annular portion 52 has fewer than eight openings (i.e. seven or less).

Referring again to FIGS. 3–11, inner annular portion 54 is a spoke attachment portion and includes an inner annular section 64 and a pair (first and second) of spoke attachment sections 66. Inner annular section 64 is preferably approximately 0.9 mm thick and is a tubular member that forms an innermost radial edge of rim 24. Spoke attachment sections 66 extend radially outwardly from inner annular section 64 and are rigidly coupled to bent sections 51b of side portions 50. Thus, inner annular portion 54 is rigidly coupled with annular side portions 50 and outer annular portion 52. Spoke attachment sections 66 are preferably about 1.1 mm thick and offset from side portions 50 due to the configuration of bent sections 51b and inner annular portion 54. More specifically, spoke attachment sections 66 are preferably offset toward center plane P of rim 24 from side portions 50 and angled relative to side portions 50.

Spoke attachment sections 66 have a plurality of circumferentially arranged spoke openings 76 formed therein, as best seen in FIGS. 3 and 4. Preferably, spoke attachment sections 66 have radial lengths of approximately 11.8 mm. In the illustrated embodiment, pairs of opposed spoke openings 76 are aligned with each other in the circumferential direction. However, it will be apparent to those skilled in the art that spoke openings 76 could be offset from each other as needed and/or desired, and discussed below in reference to another embodiment of the present invention. Spoke openings 76 are preferably spaced radially outwardly of inner annular section 64 such that spoke openings 76 are adjacent bent sections 51b of side portions 50. However, when spokes 22 are coupled to rim 24 via spoke attachment sections 66, spokes 22 do not interfere with braking action on rim 24 due to the presence of bent sections 51b.

As mentioned above, outer annular portion 52 preferably includes a single aperture 72 that is adapted to receive part of the valve 75 therein. Inner annular portion 54 also includes a valve aperture 74 for receiving part of the valve 75, as seen in FIG. 9. More specifically, valve aperture 74 is preferably formed in inner annular section 64 of inner annular portion 54. Preferably, outer annular portion 52 is free of openings except for valve aperture 72. Moreover, inner annular section 64 is also preferably free of openings except for valve aperture 74. Valve 75 is relatively conventional and preferably centered between adjacent pairs of spokes 22. Accordingly, valve 75 will not be discussed or illustrated in detail herein.

Spoke openings 76 are formed in spoke attachment sections 66 and preferably equally spaced about the circumference of spoke attachment sections 66. In this embodiment, the spoke openings 76 are preferably circular openings that are larger than the outer end portions 40 of the spokes 22. Spoke openings 76 of the present invention are larger than conventional spoke openings. Therefore, washers 48 distribute the forces on rim 24 over a greater area than ordinary round spokes such that stress fracturing and/or tearing of rim 24 is minimized.

Figure 10:
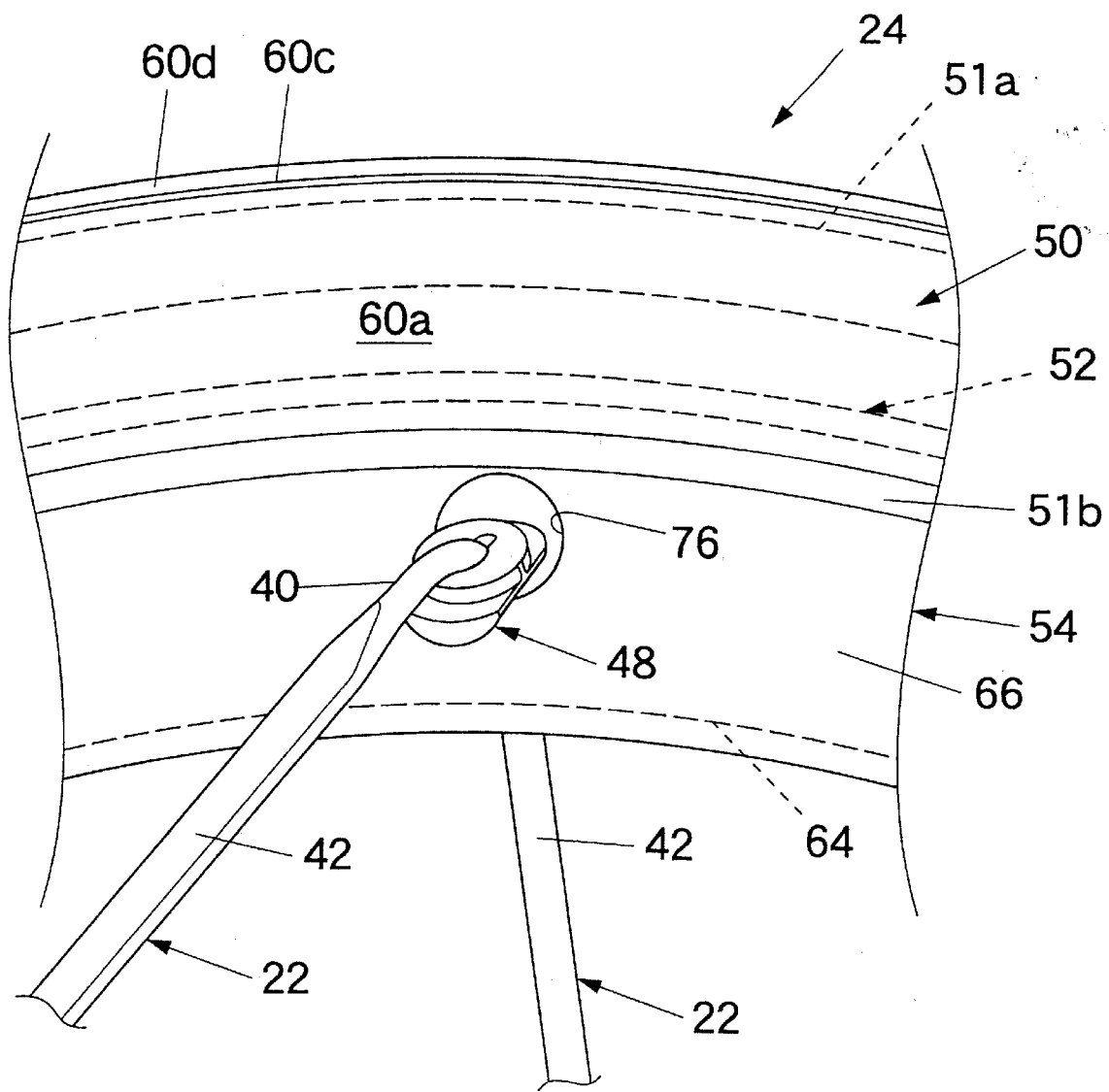
FIG. 10 is an enlarged, partial side elevational view of a portion of the rear bicycle wheel illustrating the spoke and reinforcement member in a first orientation prior to inserting the outer end of the spoke and reinforcement member into one of the spoke openings.
Figure 11:
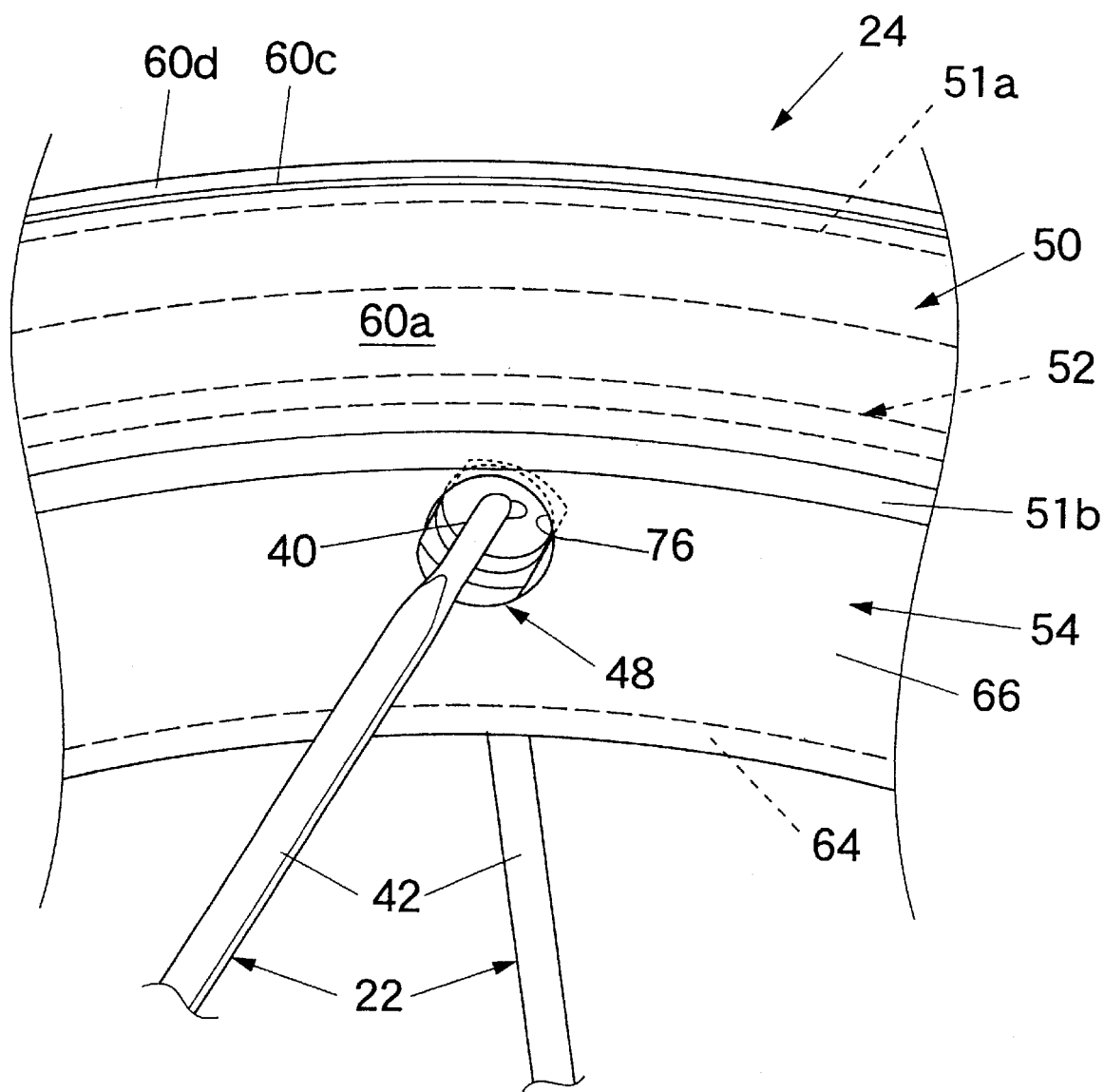
FIG. 11 is an enlarged, partial side elevational view of a portion of the rear bicycle wheel illustrating the spoke and reinforcement member in the first orientation after starting to insert the reinforcement member and the outer end of the spoke into the spoke opening of the rim.

Referring again to FIG. 4, spoke openings 76 preferably have radial lengths larger than about one-half of the radial lengths of spoke attachment sections 66 (i.e. larger than about 5.9 mm). More specifically, spoke openings 76 preferably are substantially circular openings that preferably have radial lengths or diameters of approximately 6.1 mm±0.05 mm. In any event, spoke openings 76 are sized and configured such that outer end portions 40 of spokes 22 with washers 48 located thereon can be inserted through spoke openings 76 as seen in FIGS. 10 and 11. Moreover, spoke openings 76 are sized and configured to retain outer end portions 40 with washers 48 mounted thereon within spoke openings 76 when spokes 22 are installed to rim 24 and hub 20.

Referring to FIGS. 14–19, washers 48 are designed to pass through the spoke openings 76 in a first relative orientation between washers 48 and the spoke openings 76, as seen in FIGS. 10 and 11. The washers 48 are also designed to be retained within the spoke openings 76 in a second relative orientation between the washers 48 and the spoke openings 76, as seen in FIG. 3. Each washer 48 has a first (smaller) substantially circular stepped portion 80, a second (larger) elongated stepped portion 82 and a centrally located spoke hole 84. Preferably, washers 48 are constructed as one-piece, unitary metallic members.

Preferably, washers 48 have an axial thickness of at least about 2.2 mm. The axial thickness of first (smaller) stepped portion 80 is preferably approximately the same thickness as spoke attachment sections 66 (i.e. approximately 1.1 mm), while the axial thickness of second (larger) stepped portion 82 is preferably larger than the axial thickness of first (smaller) stepped portion 80. In any event, washers 48 have first and second transverse dimensions Y and Z (noted in FIGS. 14 and 15) that are so dimensioned relative to spoke openings 76 such that the washers 48 with the outer portions 40 of the spokes 22 coupled thereto can pass through spoke openings 76 in the first relative orientation and be retained in spoke openings 76 in the second orientation.

Each first stepped portion 80 of each washer 48 has a first maximum width and each second stepped portion 82 has a second maximum width that forms an abutment surface with two abutment sections 86a and 86b located between first and second stepped portions 80 and 82. First stepped portions 80 are sized and configured to be located within spoke opening 76 of spoke attachment sections 66 of rim 24, such that abutment surface 86 contacts the interior of rim 24. In this embodiment, each second transverse dimension Z (noted in FIG. 14) is substantially equal to the second maximum width of second stepped portions 82 to retain the washers 48 in the spoke openings 76.

Abutment sections 86a and 86b extend from a pair of end surfaces 87a and 87b (bottom and top end surfaces 87a and 87b) of second portion 82 to the outer periphery of first portion 80. End surfaces 87a and 87b are partial cylindrical surfaces extending in an axial direction of washers 48 such that end surfaces 87a and 87b lie on an imaginary cylinder with a diameter corresponding to the second maximum width of second portion 82 and the second transverse dimension Z of washer 48.

Each washer 48 includes a pair of curved side surfaces 88 extending generally in the longitudinal direction of the washers 48. The first transverse dimension Y (noted in FIG. 15) is measured between the pair of curved side surfaces 88. Transverse dimension Y is preferably the same, or slightly smaller than the size of spoke openings 76. More specifically, transverse dimension Y (noted in FIG. 15) is preferably about 6.0 mm±0.05 mm. In other words, curved side surfaces 88 are preferably formed on an imaginary circle or cylinder with a diameter of approximately 6.0 mm±0.05 mm. Accordingly, transverse dimension Y can be considered the diameter of this imaginary circle or cylinder.

Figure 15:
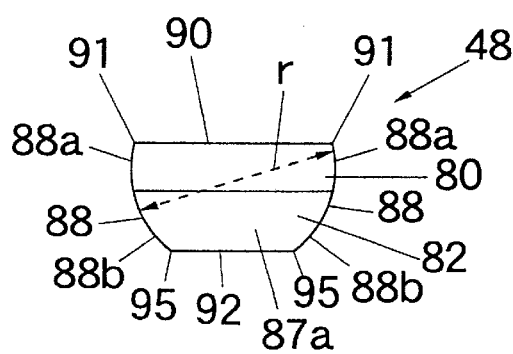
FIG. 15 is an end edge elevational view of the reinforcement member or washer illustrated in FIG. 14.
Figure 18:
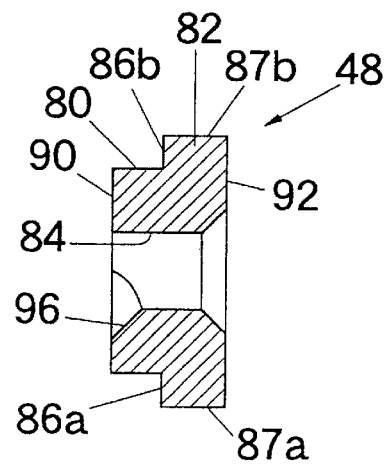
FIG. 18 is a longitudinal cross-sectional view of the reinforcement member or washer illustrated in FIGS. 14–17 as seen along section line 18—18 of FIG. 14.
Figure 16:
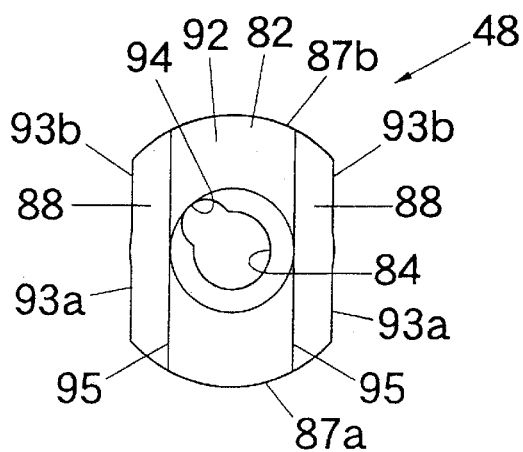
FIG. 16 is an opposite side elevational view of the reinforcement member or washer illustrated in FIGS. 14 and 15.
Figure 19:
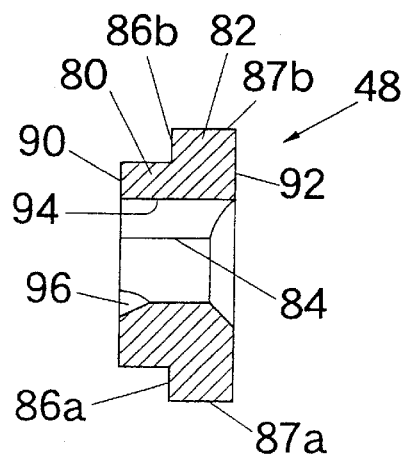
FIG. 19 is a longitudinal cross-sectional view of the reinforcement member or washer illustrated in FIGS. 14–17 as seen along section line 19—19 of FIG. 14.

Basically, curved side surfaces 88 are formed by a pair of first curved side sections 88*a* and a pair of second curved side sections 88*b* as best seen in FIG. 15. The maximum width of first portion 80 is preferably approximately 6.0 mm (+0.05 mm or −0.01 mm). Accordingly, the maximum width of first portion 80 can be slightly larger than the first transverse dimension Y. Therefore, in the illustrated embodiment, first portion 80 does not have a completely cylindrical outer peripheral surface and has the pair of first curved side sections 88*a*. In other words, the outer peripheral surface of the first portion 80 is substantially cylindrical, except for the presence of the pair of first curved side sections 88*a*.

Curved side surfaces 88 are basically convex curved surfaces that extend between a pair of axial faces 90 and 92 of first and second portions 80 and 82 of washers 48 to form several pairs of parallel edges. Specifically, the first edges 91 are formed at end face 90, the second edges 93*a* and 93*b* are formed at abutment sections 86*a* and 86*b*, and the third edges 95 are formed at end face 92.

Spoke holes 84 of reinforcement washers 48 are designed so that spokes 22 can freely pass therethrough. In the illustrated embodiment, the center portions 42 of spokes 22 are elliptical in cross-section. Accordingly, spoke holes 84 have longitudinally extending slots 94 that increase the effective diameter or width of spoke holes 84 to allow the center portions 42 of spokes 22 to pass therethrough.

A slanted cutout or notch 96 is formed on the axial face of first stepped portion 80. This notch 96 accommodates the bent section 47 of the outer end portion 40 of spoke 22. Preferably, notch 96 is located approximately 135° from slot 94. Thus, when bent section 47 of spoke 22 is seated in notch 96, movement of spoke 22 in spoke hole 84 is limited.

Front Wheel

Figure 21:
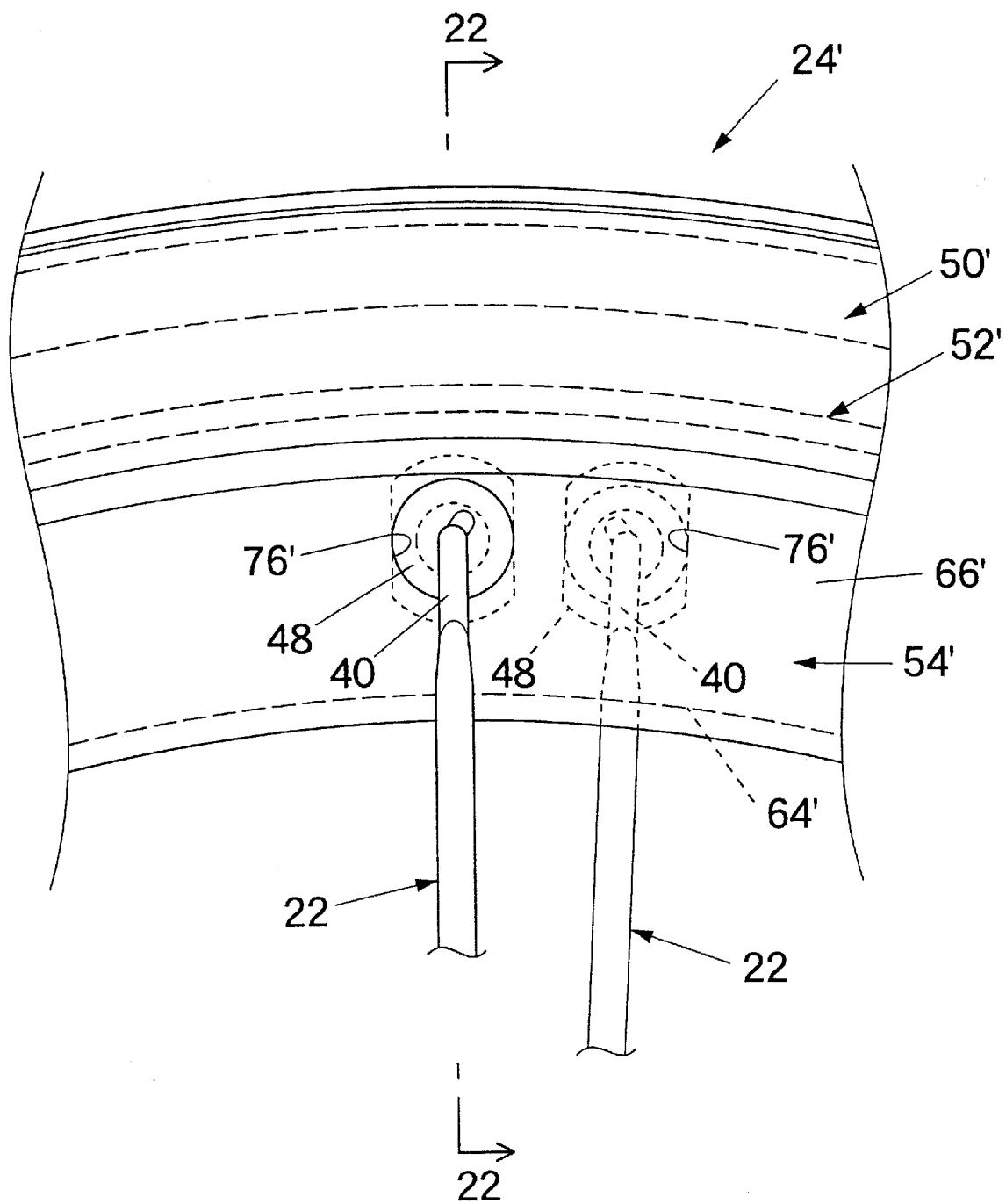
FIG. 21 is an enlarged, partial side elevational view of a portion of the bicycle wheel illustrated in FIG. 20 showing the connection between the rim and two of the spokes of the bicycle wheel offset in the circumferential direction.
Figure 22:
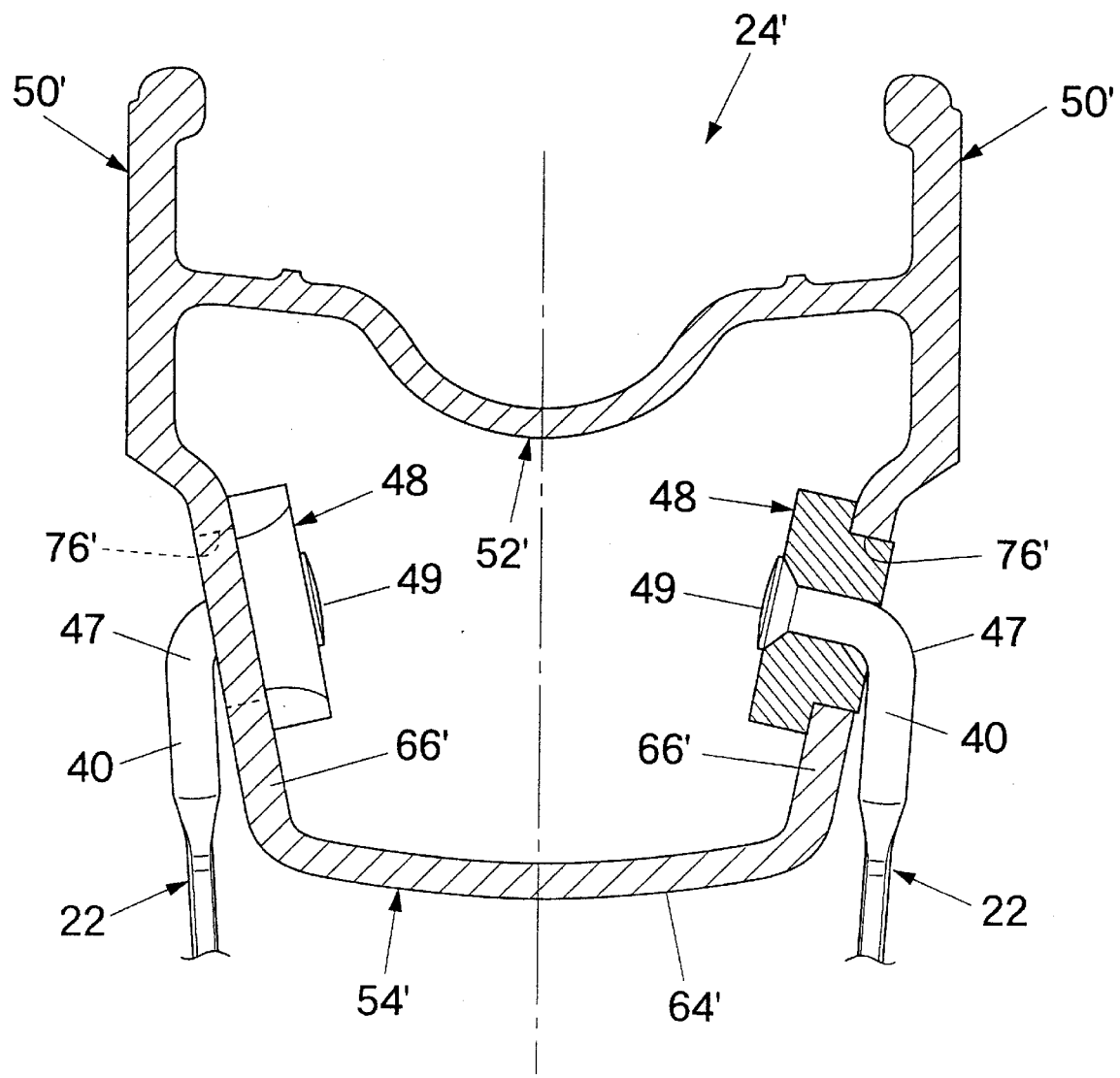
FIG. 22 is a partial cross-sectional view of the bicycle rim as seen along section line 22—22 of FIG. 21 with two of the spokes of the bicycle wheel offset in the circumferential direction.

Referring now to FIGS. 20–22, an alternate bicycle wheel 12' with an alternate front hub 20', twenty tangential spokes 22 with washers 48 and a rim 24' is illustrated in accordance with an alternate embodiment of the present invention. Basically, rim 24' is identical to rim 24, except that configuration of the spoke openings has been modified for use with modified hub 20'. More specifically, rim 24' includes circumferentially offset pairs of spoke openings 76' rather than the circumferentially aligned pairs of spoke openings 76 of rim 24. Moreover, rim 24' is designed for use with twenty (20) spokes 22. In view of the similarities between the rims 24 and 24', the following description of the rim 24' will focus mainly on the differences.

While wheel 12' is a front wheel, it will be apparent to those skilled in the art from this disclosure that the description pertaining to the construction of bicycle wheel 12' applies to either a front bicycle wheel or a rear bicycle wheel. Moreover, it will be apparent to those skilled in the art that rim 24' could utilize more or less than twenty spokes and/or radial spokes if needed and/or desired. Finally, it will be apparent to those skilled in the art from this disclosure that most of the description of the rim 24 applies to the description of rim 24' of this alternate embodiment.

Rim 24' basically includes a pair of annular side portions 50', an outer annular portion 52' and an inner annular portion 54'. Annular side portions 50' and outer annular portion 52' are identical to annular side portions 50 and outer annular portion 52 of the rear wheel 12. Thus, annular side portions 50' and outer annular portion 52' will not be discussed or illustrated in detail herein. Inner annular portion 54' is a slightly modified version of inner annular portion 54 of the rim 24. More specifically, inner annular portion 54' of this alternate embodiment includes an inner annular section 64' and a pair of annular spoke attachment sections 66'. Spoke attachment sections 66' include a plurality of circumferentially arranged spoke openings 76'.

Spoke openings 76' of this alternate embodiment are identical to spoke openings 76 of the rim 24 except that opposing pairs of spoke openings 76' are circumferentially offset from each other. Spoke openings 76' are configured for receiving outer ends 40 of spokes 22 with reinforcement members or washers 48 therein in a manner identical to the first embodiment. This configuration of rim 24' is designed for a front hub 20' with twenty tangential spokes 22. In other words, hub 20' has two spoke attachment flanges, with each flange having five spoke attachment points 32'. Two spokes 22 are coupled to each spoke attachment point. These types of hubs are relatively conventional. Thus, hub 20' will not be discussed or illustrated in detail herein. In other words, rim 24' of this alternate embodiment is identical to rim 24, except the configuration (or arrangement) of the spoke openings 76 of rim 24 has been slightly modified in rim 24' of this embodiment. Thus, rim 24' will not be discussed or illustrated in detail herein.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle rim comprising:

first and second annular side portions having first and second ribs extending toward each other to form opposing first and second annular tire supporting surfaces;

an outer annular portion extending between said first and second annular side portions to form first and second outer corners, said outer annular portion including a center connecting surface, first and second outer inclined surfaces adjacent said first and second outer corners, first and second inner inclined surfaces adjacent said center connecting surface, and first and second ridges dividing said first and second outer inclined surfaces from said first and second inner inclined surfaces, respectively; and a spoke attachment portion rigidly coupled with said first and second annular side portions, said first and second ridges protruding in a radially outward direction relative to said first and second outer inclined surfaces, said first and second ridges being located substantially adjacent said outer corners relative to an overall axial width of said outer annular portion such that said first and second ridges are configured and arranged to be directly located partially beneath first and second annular reinforcement members that are embedded in first and second beads of a conventional bicycle tire as seen in a radial plane when the conventional bicycle tire is installed on said rim.

2. The bicycle rim according to claim 1, wherein said first inner and outer inclined surfaces are angled between about three degrees and about seventeen degrees relative to an imaginary line passing through said first and second outer corners; and said second inner and outer inclined surfaces are angled between about three degrees and about seventeen degrees relative to an imaginary line passing through said first and second outer corners.

3. The bicycle rim according to claim 2, wherein said first inner and outer inclined surfaces are angled about five degrees relative to said imaginary line passing through said first and second outer corners; and said second inner and outer inclined surfaces are angled about five degrees relative to said imaginary line passing through said first and second outer corners.

4. The bicycle rim according to claim 1, wherein said first inner and outer inclined surfaces are substantially parallel; and said second inner and outer inclined surfaces are substantially parallel.

5. The bicycle rim according to claim 1, wherein said first outer inclined surface has a first outer length and said first inner inclined surface has a first inner length smaller than said first outer length; and said second outer inclined surface has a second outer length and said second inner inclined surface has a second inner length smaller than said second outer length.

6. The bicycle rim according to claim 5, wherein said first inner length is less than one-tenth of said first outer length; and said second inner length is less than one-tenth of said second outer length.

7. The bicycle rim according to claim 6, wherein said first outer length is approximately 1.92 mm; and said second outer length is approximately 1.92 mm.

8. The bicycle rim according to claim 6, wherein said first inner and outer inclined surfaces are substantially parallel; and said second inner and outer inclined surfaces are substantially parallel.

9. The bicycle rim according to claim 1, wherein said first tire supporting surface includes a first recessed section and a first retaining section extending from said first recessed section to form said first rib; and said second tire supporting surface includes a second recessed section and a second retaining section extending from said second recessed section to form said second rib.

10. The bicycle rim according to claim 9, wherein said first and second recessed sections are substantially parallel.

11. The bicycle rim according to claim 1, wherein said first annular ridge includes a first convex curved surface connected to said first inner and outer annular inclined surfaces in a smooth manner;

said second annular ridge includes a second convex curved surface connected to said second inner and outer annular inclined surfaces in a smooth manner.

12. The bicycle rim according to claim 11, wherein said first convex curved surface has a radius of curvature of approximately 0.4 mm; and said second convex curved surface has a radius of curvature of approximately 0.4 mm.

13. The bicycle rim according to claim 11, wherein said first ridge includes concave intersection areas to connect said first ridge to said first inner and outer inclined surfaces; and said second ridge includes concave intersection areas to connect said second ridge to said second inner and outer inclined surfaces.

14. The bicycle rim according to claim 1, wherein said first ridge has a first upper edge spaced approximately 0.3 mm from a line passing through said first outer inclined surface; and said second ridge has a second upper edge spaced approximately 0.3 mm from a line passing through said second outer inclined surface.

15. The bicycle rim according to claim 1, wherein said first and second annular side portions include first and second ground annular braking surfaces, respectively.

16. The bicycle rim according to claim 15, wherein said first and second annular side portions include first and second sloping surfaces extending from said first and second ground annular braking surfaces to form first and second outer edges of said first and second ground annular braking surfaces, respectively.

17. The bicycle rim according to claim 16, wherein said first and second annular side portions include first and second outer curved surfaces, respectively; and said first and second sloping surfaces terminate at said first and second outer curved surfaces.

18. The bicycle rim according to claim 1, wherein said rim is symmetrical relative to a center plane passing through said center connecting surface.

19. A bicycle rim according to claim 1, wherein said outer annular portion is free of openings except for a single valve aperture that is adapted to receive part of a valve therein.

20. A bicycle rim comprising:

first and second annular side portions having first and second ribs extending toward each other to form opposing first and second annular tire supporting surfaces;

an outer annular portion extending between said first and second annular side portions to form first and second outer corners, said outer annular portion including a center connecting surface, first and second outer inclined surfaces adjacent said first and second outer corners, first and second inner inclined surfaces adjacent said center connecting surface, and first and second ridges dividing said first and second outer inclined surfaces from said first and second inner inclined surfaces, respectively; and a spoke attachment portion rigidly coupled with said first and second annular side portions, said first tire supporting surface including a first recessed section and a first retaining section extending from said first recessed section to form said first rib, said second tire supporting surface including a second recessed section and a second retaining section extending from said second recessed section to form said second rib, and said first and second ridges being spaced approximately 3.25 mm from said first and second recessed sections, respectively.

21. A bicycle rim and tire assembly comprising:
a bicycle rim including
first and second annular side portions having first and second ribs extending toward each other to form opposing first and second annular tire supporting surfaces,
an outer annular portion extending between said first and second annular side portions to form first and second outer corners, said outer annular portion including outwardly protruding first and second ridges spaced inwardly from said first and second outer corners, respectively, and
a spoke attachment portion rigidly coupled with said first and second annular side portions; and
a bicycle tire including
an annular outer tread portion,
first and second annular sidewalls coupled to said annular outer tread portion and extending radially inwardly of said annular outer tread portion, and
first and second annular beads coupled to said first and second annular sidewalls, respectively, said first and second annular beads having first and second annular reinforcement members, first and second annular side surfaces supported by said first and second annular tire supporting surfaces and first and second inner annular surfaces supported on said first and second ridges, respectively,
said first and second annular reinforcement members being located mostly between said first and second ridges and said first and second outer corners of said rim, respectively, but also being located to partially overlie said first and second ridges, respectively, in a radially extending plane.

22. The bicycle rim and tire assembly according to claim 21, wherein
said first bead has a first inner section located on a first inner side of said first ridge and a first outer section located on a first outer side of said first ridge; and
said second bead has a second inner section located on a second inner side of said second ridge and a second outer section located on a second outer side of said second ridge.

23. The bicycle rim and tire assembly according to claim 22, wherein
said first and second annular reinforcement members are formed of metal.

24. The bicycle rim and tire assembly according to claim 22, wherein
said first and second annular reinforcement members are formed of non-metallic material.

25. The bicycle rim and tire assembly according to claim 22, wherein
said first annular reinforcement member has width between about 2.0 mm and about 3.0 mm; and
said second annular reinforcement member has width between about 2.0 mm and about 3.0 mm.

26. The bicycle rim and tire assembly according to claim 25, wherein
each of said first and second annular reinforcement members has a substantially circular cross-sectional shape.

27. The bicycle rim and tire assembly according to claim 22, wherein
said first tire supporting surface includes a first recessed section and a first retaining section extending from said first recessed section to form said first rib; and
said second tire supporting surface includes a second recessed section and a second retaining section extending from said second recessed section to form said second rib.

28. The bicycle rim and tire assembly according to claim 27, wherein
said outer annular portion includes first and second outer inclined surfaces arranged between said first and second outer corners and said first and second ridges, respectively.

29. The bicycle rim and tire assembly according to claim 28, wherein
said first outer inclined surface is angled about five degrees relative to an imaginary line passing through said first and second outer corners; and
said second outer inclined surface is angled about five degrees relative to said imaginary line passing through said first and second outer corners.

30. The bicycle rim and tire assembly according to claim 21, wherein
said tire includes first and second annular recesses configured to mate with said first and second ribs, respectively.

31. The bicycle rim and tire assembly according to claim 21, wherein
said outer annular portion is free of openings except for a single valve aperture that is adapted to receive part of a valve therein.

32. A bicycle rim and tire assembly comprising:
a bicycle rim including
first and second annular side portions having first and second ribs extending toward each other to form opposing first and second annular tire supporting surfaces;
an outer annular portion extending between said first and second annular side portions to form first and second outer corners, said outer annular portion including first and second ridges spaced inwardly from said first and second outer corners, respectively; and
a spoke attachment portion rigidly coupled with said first and second annular side portions; and
a bicycle tire including
an annular outer tread portion;
first and second annular sidewalls coupled to said annular outer tread portion and extending radially inwardly of said annular outer tread portion; and
first and second annular beads coupled to said first and second annular sidewalls, respectively, said first and second annular beads having first and second annular side surfaces supported by said first and second annular tire supporting surfaces and first and second inner annular surfaces supported on said first and second ridges, respectively,
said first bead having a first inner section located on a first inner side of said first ridge and a first outer section located on a first outer side of said first ridge,
said second bead having a second inner section located on a second inner side of said second ridge and a second outer section located on a second outer side of said second ridge,
said first inner section being spaced from said outer annular portion of said rim and said first outer section contacts said outer annular portion, and
said second inner section being spaced from said outer annular portion of said rim and said second outer section contacts said outer annular portion.

33. The bicycle rim and tire assembly according to claim 32, wherein
    said first bead includes a first annular reinforcement member; and
    said second bead includes a second annular reinforcement member.
34. A bicycle rim and tire assembly comprising:
    a bicycle rim including
        first and second annular side portions having first and second ribs extending toward each other to form opposing first and second annular tire supporting surfaces;
        an outer annular portion extending between said first and second annular side portions to form first and second outer corners, said outer annular portion including first and second ridges spaced inwardly from said first and second outer corners, respectively; and
        a spoke attachment portion rigidly coupled with said first and second annular side portions; and
    a bicycle tire including
        an annular outer tread portion;
        first and second annular sidewalls coupled to said annular outer tread portion and extending radially inwardly of said annular outer tread portion; and
        first and second annular beads coupled to said first and second annular sidewalls, respectively, said first and second annular beads including first and second annular reinforcement members, first and second annular side surfaces supported by said first and second annular tire supporting surfaces and first and second inner annular surfaces supported on said first and second ridges, respectively,
    said first and second annular reinforcement members being spaced from said first and second annular side surfaces such that said first and second annular reinforcement members are at least partially overlie said first and second ridges, respectively, in a radially extending plane.
35. A bicycle rim and tire assembly comprising:
    a bicycle rim including
        first and second annular side portions having first and second ribs extending toward each other to form opposing first and second annular tire supporting surfaces;
        an outer annular portion extending between said first and second annular side portions to form first and second outer corners, said outer annular portion including outwardly protruding first and second ridges spaced inwardly from said first and second outer corners, respectively; and
        a spoke attachment portion rigidly coupled with said first and second annular side portions,
    a bicycle tire including
        an annular outer tread portion;
        first and second annular sidewalls coupled to said annular outer tread portion and extending radially inwardly of said annular outer tread portion; and
        first and second annular beads coupled to said first and second annular sidewalls, respectively, said first and second annular beads having first and second annular side surfaces supported by said first and second annular tire supporting surfaces and first and second inner annular surfaces supported on said first and second ridges, respectively,
    said first bead having a first inner section located on a first inner side of said first ridge and a first outer section located on a first outer side of said first ridge,
    said second bead having a second inner section located on a second inner side of said second ridge and a second outer section located on a second outer side of said second ridge,
    said first tire supporting surface including a first recessed section and a first retaining section extending from said first recessed section to form said first rib, and
    said second tire supporting surface including a second recessed section and a second retaining section extending from said second recessed section to form said second rib, and
    said first and second ridges being spaced approximately 3.25 mm from said first and second recessed sections, respectively.
36. The bicycle rim and tire assembly according to claim 35, wherein
    said first and second recessed sections are substantially parallel.
37. A bicycle rim comprising:
    first and second annular side portions having first and second ends to form opposing first and second annular tire supporting surfaces;
    an outer annular portion extending between said first and second annular side portions and adapted to support a tire thereon; and
    a spoke attachment portion rigidly coupled with said first and second annular side portions,
    said first and second annular side portions including first and second outer side surfaces, first and second ground annular braking surfaces spaced from said first and second outer side surfaces, and first and second sloping surfaces extending in a radially outward direction and in an axially inward direction from said first and second ground annular braking surfaces, respectively, to form first and second discontinuities such that said first and second outer side surfaces are spaced in the axially inward direction relative to said first and second ground annular braking surfaces, respectively.
38. The bicycle rim according to claim 37, wherein
    said first and second sloping surfaces are angled approximately 240° relative to said first and second ground annular braking surfaces to form first and second outer edges of said first and second ground annular braking surfaces, respectively.
39. The bicycle rim according to claim 38, wherein
    said first and second ends of said first and second annular side portions include convex curved surfaces to form said first and second outer side surfaces, respectively.
40. The bicycle rim according to claim 39, wherein
    said first and second sloping surfaces terminate at said first and second convex curved surfaces to form first and second internal corners.
41. The bicycle rim according to claim 37, wherein
    said first and second sloping surfaces are angled approximately 120° relative to said first and second outer side surfaces to form first and second internal corners, respectively.
42. The bicycle rim according to claim 37, wherein
    said first and second ends of said first and second annular side portions include convex curved surfaces to form said first and second outer side surfaces, respectively.
43. A bicycle rim and tire assembly comprising:
    a bicycle rim including
        first and second annular side portions having first and second ribs extending toward each other to form opposing first and second annular tire supporting surfaces;

an outer annular portion extending between said first and second annular side portions to form first and second outer corners, said outer annular portion including outwardly protruding first and second ridges spaced inwardly from said first and second outer corners, respectively; and a spoke attachment portion rigidly coupled with said first and second annular side portions; and a bicycle tire including an annular outer tread portion;

first and second annular sidewalls coupled to said annular outer tread portion and extending radially inwardly of said annular outer tread portion; and first and second annular beads coupled to said first and second annular sidewalls and having first and second inner foot surfaces supported on said first and second ridges, respectively, said first and second annular beads having first and second annular reinforcement members with first and second center axes arranged such that said first and second ridges are located between said first and second center axes and first and second inner edges of said first and second foot surfaces, respectively, and said first and second annular reinforcement members being spaced from said first and second annular tire supporting surfaces such that said first and second annular reinforcement members are at least partially overlie said first and second ridges, respectively, in a radially extending plane.

44. The bicycle rim and tire assembly according to claim 43, wherein said first and second annular reinforcement members are formed of metal.

45. The bicycle rim and tire assembly according to claim 43, wherein said first and second annular reinforcement members are formed of non-metallic material.

46. The bicycle rim and tire assembly according to claim 43, wherein said first annular reinforcement member has width between about 2.0 mm and about 3.0 mm; and said second annular reinforcement member has width between about 2.0 mm and about 3.0 mm.

47. The bicycle rim and tire assembly according to claim 46, wherein each of said first and second annular reinforcement members has a substantially circular cross-sectional shape.

48. The bicycle rim and tire assembly according to claim 43, wherein said first and second annular reinforcement members are located below said first and second ribs, respectively.

49. The bicycle rim and tire assembly according to claim 43, wherein said outer annular portion includes first and second outer inclined surfaces arranged between said first and second outer corners and said first and second ridges to support said first and second annular beads, respectively.

* * * * *